(12) United States Patent
Fridley et al.

(10) Patent No.: US 6,229,432 B1
(45) Date of Patent: May 8, 2001

(54) INTELLIGENT TRANSCEIVER MODULE PARTICULARLY SUITED FOR POWER LINE CONTROL SYSTEMS

(76) Inventors: Duane Patrick Fridley, 7541 Santa Monica Dr. Apt. A, Indianapolis, IN (US) 46268; Curtis L. Coffee, 202 W. 44th St., Indianapolis, IN (US) 46208; Kevin J. Shelow, 4723 N. Evanston Ave., Indianapolis, IN (US) 46205

( * ) Notice: Subject to any disclaimer, the term of this patent is extended or adjusted under 35 U.S.C. 154(b) by 0 days.

(21) Appl. No.: 09/183,708

(22) Filed: Oct. 30, 1998

Related U.S. Application Data
(60) Provisional application No. 60/064,432, filed on Oct. 30, 1997.

(51) Int. Cl.[7] ................................................. H04M 11/04
(52) U.S. Cl. ................... 340/310.01; 340/506; 340/532; 340/538; 340/825.06; 340/310.04; 340/310.06
(58) Field of Search ................................. 340/506, 531, 340/532, 533, 534, 538, 825.06, 310.02, 310.04, 310.06, 310.01

(56) References Cited

U.S. PATENT DOCUMENTS

| | | | |
|---|---|---|---|
| 4,200,862 | 4/1980 | Campbell et al. | 340/310.01 |
| 4,556,864 | 12/1985 | Roy | 340/310.01 |
| 4,638,299 | 1/1987 | Campbell | 340/310.01 |
| 5,400,246 | * 3/1995 | Wilson et al. | 340/825.06 |
| 5,491,463 | 2/1996 | Sargeant et al. | 340/310.01 |
| 5,903,213 | * 5/1999 | Hodge et al. | 340/310.01 |

* cited by examiner

*Primary Examiner*—Daryl Pope
(74) *Attorney, Agent, or Firm*—Baker & Daniels

(57) ABSTRACT

The present invention involves a module on a single board for a power line control system including a transmitter circuit, a receiver circuit, and a control circuit. The transmitter circuit sends signals over the power line. The receiver circuit receives signals sent over the power line. The control circuit couples to the transmitter circuitry and the receiver circuitry. The control circuit includes a microprocessor and associated memory. The memory includes instructions enabling the microprocessor to interpret the received signals, generate transmit signals, and control the circuit which controls the electrical appliance. The receiver circuit includes feedback for attenuating the input signal to the receiver circuit. The microprocessor includes an output signal for attenuating the input signal to the receiver circuit. The memory includes programmable memory which can be FLASH memory. The memory also includes serial EEPROM. The control circuit includes a low voltage reset for automatically resetting the microprocessor after a low voltage condition. The transmitter circuit provides a 6 volts peak to peak signal on a 5 ohm reactance loaded power line. The receiver circuit provides a minimum sensitivity of 25 mv over a loaded power line. The memory includes instructions for sending an automatic acknowledge upon receiving a valid signal. The instructions also include instructions for determining a start code by comparing bit count values for four consecutive bits.

86 Claims, 16 Drawing Sheets

INTELLIGENT TRANSCEIVER MODULE PARTICULARLY SUITED FOR POWER LINE CONTROL SYSTEMS

CROSS REFERENCE TO RELATED APPLICATIONS

This application claims the benefit under Title 35, U.S.C. §119(e) of U.S. Provisional Patent Application Ser. No. 60/064,432, entitled INTELLIGENT TRANSCEIVER MODULE PARTICULARLY SUITED FOR POWER LINE CONTROL SYSTEMS, filed on Oct. 30, 1997.

BACKGROUND OF THE INVENTION

The present invention pertains to an electrical control module, and, in particular, to a module adapted for use within a Power line Control Component ("PCC") to enhance electrical appliance control.

The control of electronic devices within a particular location previously has been achieved via a data communication system that works over the power lines of that location. Existing power line control systems typically utilize a centrally located transmitter connected to the power line, as well as receivers connected to the power line and circuited with electrical appliances. The receivers, upon the receipt of certain commands from the transmitter, operate to control the electrical appliances and thereby achieve a remote control of such appliances from the site of the transmitter. The transmitter and receivers communicate over the interconnecting power lines, such as via the X-10 protocol developed by Pico Electronics of Fife, Scotland. A further description of the X-10 protocol and PCCs are found in U.S. Pat. Nos. 4,200,862 and 5,491,463, which both are in their entirety incorporated herein by reference, the latter patent is assigned to the assignee of the present invention. While useful, existing power line control systems suffer from a variety of shortcomings which limit their desirability from a practical standpoint, as well as may make their implementation prohibitively expensive in certain circumstances.

One problem with existing power line control systems is that current Application Specific Integrated Circuits ("ASIC") solutions for PCCs have limited end device applications as they are made to operate with specific hardware devices. In particular, to support a new end device, a new ASIC chip to perform the required task must be custom manufactured. This technique frequently is so expensive as to make many applications commercially impractical.

Another problem with existing power line control systems relates to the lack of good signal to noise response and sensitivity. Most current X-10 based products utilize band pass filters, Automatic Gain Control ("AGC") and frequency counting methods to determine the presence of a signal on the power line. While the X-10 AGC is helpful when there is noise on the line, as typically implemented it is only useful if the signal is about twice as large as the noise on the line. Consequently, weaker signals might not be picked up on some occasions, and the commands being relayed via those weaker signals go unexecuted.

Another problem with the existing power line control systems is the accuracy of the transmit carrier frequency and signal amplitude. Most X-10 based transmitters utilize a slug tuned LC oscillator which can vary from 118 to 122 kHz. Receiver sensitivity is reduced when the received carrier frequency is not 120 kHz. The carrier amplitude of X-10 based transmitters can also vary from 2 to 3.5 Vp-p into a 5 ohm reactance loaded power line. Communication reliability is reduced when the transmit carrier amplitude is reduced.

Still another problem is that new product development is time consuming and therefore slow. Current practices require re-layout and design of common circuitry for new products, and this process lengthens the time to market for new PCCs. Moreover, the need to rewrite the microprocessor code for common communications routines into each new product is time-consuming.

Another problem is that existing PCCs are inflexible for users to set protocol options. Current products are coded in permanent non-volatile memory to handle a fixed protocol and therefore there is no capability for options to be adjusted according to the preferences of the end user for system enhancement.

Another problem with most power line control systems is that because acknowledgment by receivers of messages from the transmitter is absent, it is not possible to ensure that messages are received and acted upon. Consequently, systems that are dependent on getting a signal to an end device need to send the messages multiple times to try and ensure that the message does indeed reach the receiver. This multiple transmission requirement reduces the overall band width of the system and increases the likelihood that other signals will not have a chance to reach their destinations.

Another problem with existing power line control systems results from large instruction sets being run from a central controller. Specifically, end devices are set to respond to a particular address, which may be part of a group depending on the command needed to be implemented. The group address is set with a hardware switch, and as a result individual devices can not respond to commands that are not directed to their group. This shortcoming is problematic when the user desires to send the same command to a set of devices that belong to different groups, as the central controller typically handles this task by sending the required commands to each of the devices in the set. In most cases, this requires a large series of commands being sent to enable and operate the individual devices, which undesirably increases traffic and noise on the power line and reduces bandwidth and response time.

Still another shortcoming with power line control systems is the inability to implement new commands. Current devices have no easy means to add new commands. Moreover, a PCC's protocol/application settings cannot be read/updated while the PCC is installed in a power line control system, and typically the PCC must be disassembled to allow for setting changes.

Still another shortcoming is that many current X-10 based systems only handle the standard code command set (0–255 possible addresses). With such systems, not enough addresses may be available in some situations, such as when being used in a large hotel.

Thus, it would be desirable to provide a device which may be used to overcome these and other shortcomings of the prior art.

SUMMARY OF THE INVENTION

The present invention provides a single board intelligent transceiver module for power line control applications. By integrating transmission, reception, and control circuitry on a single board, a complete module can be located at any point of the circuit. The single board construction, along with the provision of programmable memory in the module, allows for quick and easy customization of the module for a variety of PCC applications without requiring modifications to the hardware design.

One advantage of the present invention is that it employs a small printed circuit board with a SIP pin out for ease of implementation and interfacing in a wide variety of end devices, without the need to re-layout the standard components in the module. In particular, by incorporating certain power line control system components, such as a transmitter, a receiver, power regulator, and a microprocessor, within a module that can be used with various products, the time to market of new power line products is reduced by freeing the designer to concentrate on only the power supply and end device interfaces. In other words, by encapsulating the common or core circuitry required for power line communications and end device control, hardware design of new devices is dramatically reduced as only the design of the device circuitry for interfacing to the module is further required.

Another advantage of the present invention is that communication routines and programming features which are standard for a PCC are modularized or incorporated into the inventive module for use with all devices. This modulariziation allows the software developer for a given product to focus on the application program (i.e. end device interfaces) and not worry about the communications or programming aspects of the product which are already satisfactorily stored on the module. In addition, it provides a consistent communications and programming interface for all new products built with this module and speeds new product introduction to the market.

Another advantage of the present invention is that by incorporating a microprocessor with programmable memory, the process of implementing a new end device is greatly simplified as a program change to interface with the new device is merely required. In addition, utilization of programmable memory with FLASH technology allows protocol changes in current devices to be achieved if necessary.

Another advantage of the present invention is that by utilizing feedback control, the S/N response to wide band noise and the module receiver's sensitivity are improved. Two ways of implementing feedback control are with a Phase Locked Loop ("PLL") or Automatic Level Control ("ALC") feedback. The receive system utilizing PLL technology will give good noise immunity and sensitivity. Phase locked loop's are also known for their narrow band filter characteristics (signal selectivity). The ALC feedback is controlled by either the received signal conditioned into a digital signal or the microprocessor.

Another advantage of the present invention is that the circuit transmit carrier frequency is created from the microprocessor clock and is very stable and accurate with a frequency of 120.12 kHz. The receivers are hand tuned to the 120.12 kHz during manufacture. Communications between transceivers is optimized when the individual receivers and transmitters are tuned to the same carrier frequency. The circuit employs a very low RDSon power MOSFET transistor for the transmit coil driver and provides a 6Vp-p carrier amplitude into a 5 ohm reactance loaded power line with a 16 volt power supply. Communication reliability is increased when the transmit carrier amplitude is increased.

Another advantage of the present invention is that the microprocessor clock is derived from a 12 MHZ ceramic resonator. The microprocessor hardware further divides the 12 Mhz by four and a software timing loop further divides the internal 3 Mhz system clock to generate the 1 ms burst of 120.12 Khz oscillations which is output on a microprocessor I/O line. The measured output signal from the present invention on a 5 ohm reactance loaded power line is 6 volts peak to peak. Prior art is 3.5 volts peak to peak.

Another advantage of the present invention is that it has a minimum receiver sensitivity of 25 mV. The existing X-10 based devices have a minimum receiver sensitivity of 40 mV. This extra receiver sensitivity increases receiver reliability.

Another advantage of the present invention is that it has a wider signal to noise operating range than X-10 based devices and has a faster response to abrupt changes in power line noise.

Still another advantage of the present invention is that it allows a user to select at a later time which of the functions already programmed onto the module during a first programming stage are to be utilized, and this function selectability enhances system operation.

Still another advantage of the present invention is that it may implement a "Status Request" command, and other inventive devices may automatically send an acknowledgment message upon reception of such a command without needing to be asked or instructed to by a controller.

Still another advantage of the present invention is that it allows address grouping to be performed at the device level, thus greatly reducing traffic on the power line and increasing response time. Each device is allowed to respond to multiple addresses, and allows implementation of simple logic or device macros. Examples of simple logic or device macros may be "If you receive an on command, turn off", "If you receive A1 on, send B1 off", "Respond to addresses A1, A3, B2, C5", etc.

Still another advantage of the present invention is that new commands are now possible to implement. For example, if a department store wishes to flash its store lights to signal shoppers that closing time is approaching, a "Flash for 20 seconds" command can be stored at the device level to be implemented when the specified command is received from the transmitter. Other examples of new commands may be "dim to off", "brighten to on", "give me your configuration", "set device configuration to . . . ", etc. These additional commands can be readily implemented by reprogramming the module.

Still another advantage of the present invention is that it enables the installer to customize the system from one central location (controller) to fine tune the system and make grouping and protocol options easy to change while the system is installed. The invention allows the end user to query the module's setting and adjust parameters accordingly.

Still another advantage of the present invention is that it allows the use of either the standard code command set or the extended code command set (0–4095 typical addresses or 0–65,535 possible addresses).

Another advantage of the present invention is that the incorporation of multiple operating elements into a relatively compact module may reduce the required size of the circuit board for the entire power line control system assembly, thereby allowing use within fairly small enclosures.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
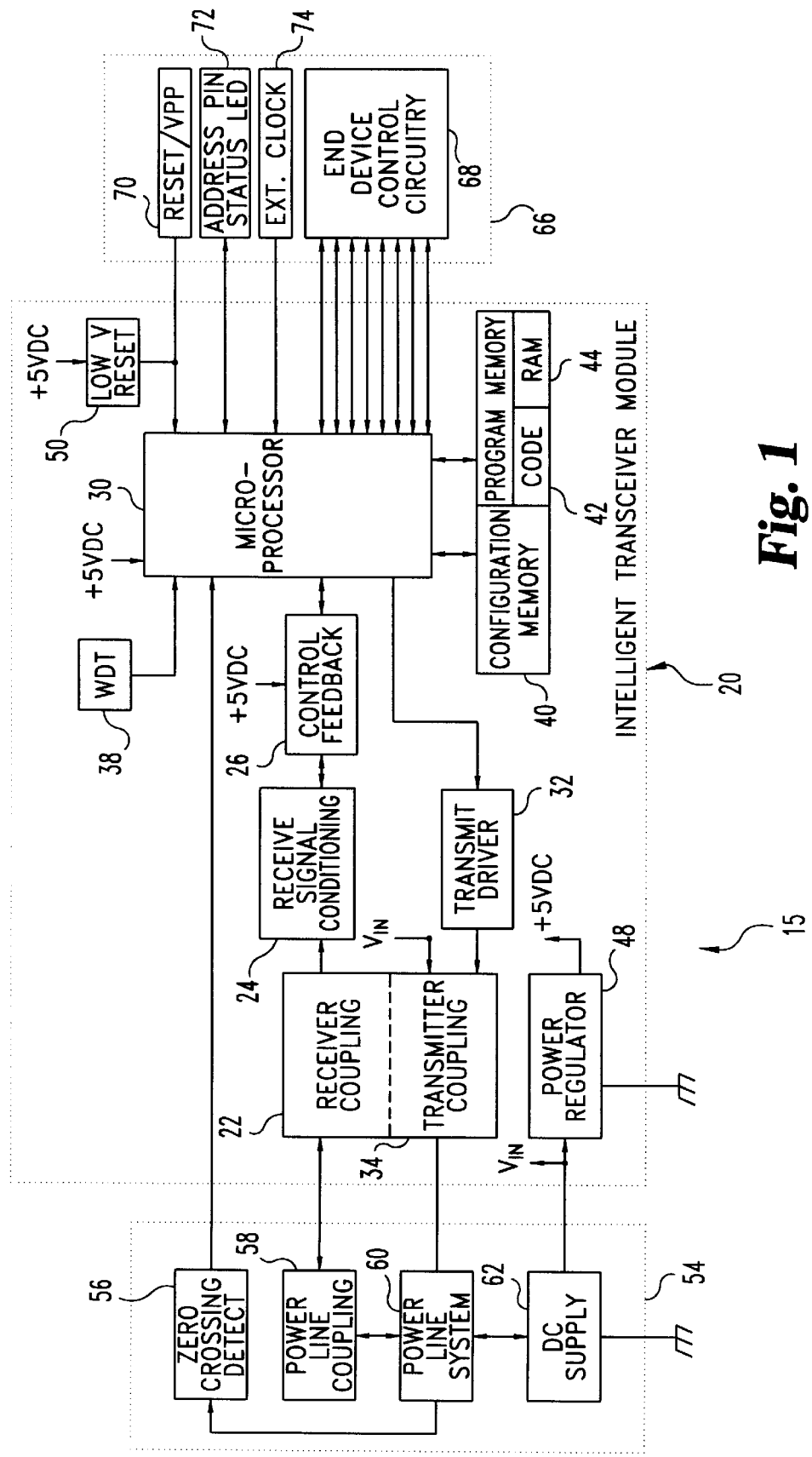
FIG. 1 is a block diagram of the intelligent transceiver module of the present invention advantageously incorporated into a power line control system.

Corresponding reference characters indicate corresponding parts throughout the several views. Although the drawings represent embodiments of the invention, the drawings are not necessarily to scale, and certain features may be exaggerated or omitted in selected drawings in order to better illustrate and explain the present invention.

DETAILED DESCRIPTION OF THE INVENTION

Referring now to FIG. 1, a power line control system assembly 15 includes a first embodiment of a intelligent transceiver module or integrated circuit chip 20 of the present invention. Module 20 is shown being employed in a power line control system because the flexibility of features it affords makes it particularly well suited for such use. Therefore, the following description is merely illustrative and is not intended to be limiting.

Intelligent transceiver module 20 is designed to be installed as a single unit on a printed circuit board or motherboard that is circuited with the other electrical components of assembly 15. The circuit board can then be installed proximate to or within a wide variety of devices electrically controlled by commands sent over existing power lines to assembly 15. The below described components or features of module 20 that are shown as separate blocks within the module indicated at 20 have been incorporated or modularized into module 20 in order to provide flexibility in new product design.

In the disclosed embodiment, module 20 includes receiver circuitry that enables reception of a signal from existing power lines and that comprises a receiver coupling device 22, received signal conditioning circuitry 24, control feedback circuitry 26, and the microprocessor 30. The module 20 plugs into the motherboard of a PCC device which fits into the typical wall electrical outlet box (typical size of outlet box is 4 inches by 2 inches by 2 inches).

Coupling device 22 is an RF tunable transformer that provides isolation for the module from the existing power lines. The transformer of coupling device 22 is wound such that the signal on the power line side of the transformer is coupled to the filter side of the transformer with a turns ratio of approximately 1:20. The secondary side of coupling device 22 is circuited with received signal conditioning circuitry 24 that filters, amplifies and conditions the received signal before passing it on to microprocessor 30 and control feedback circuitry 26.

Figure 6A:
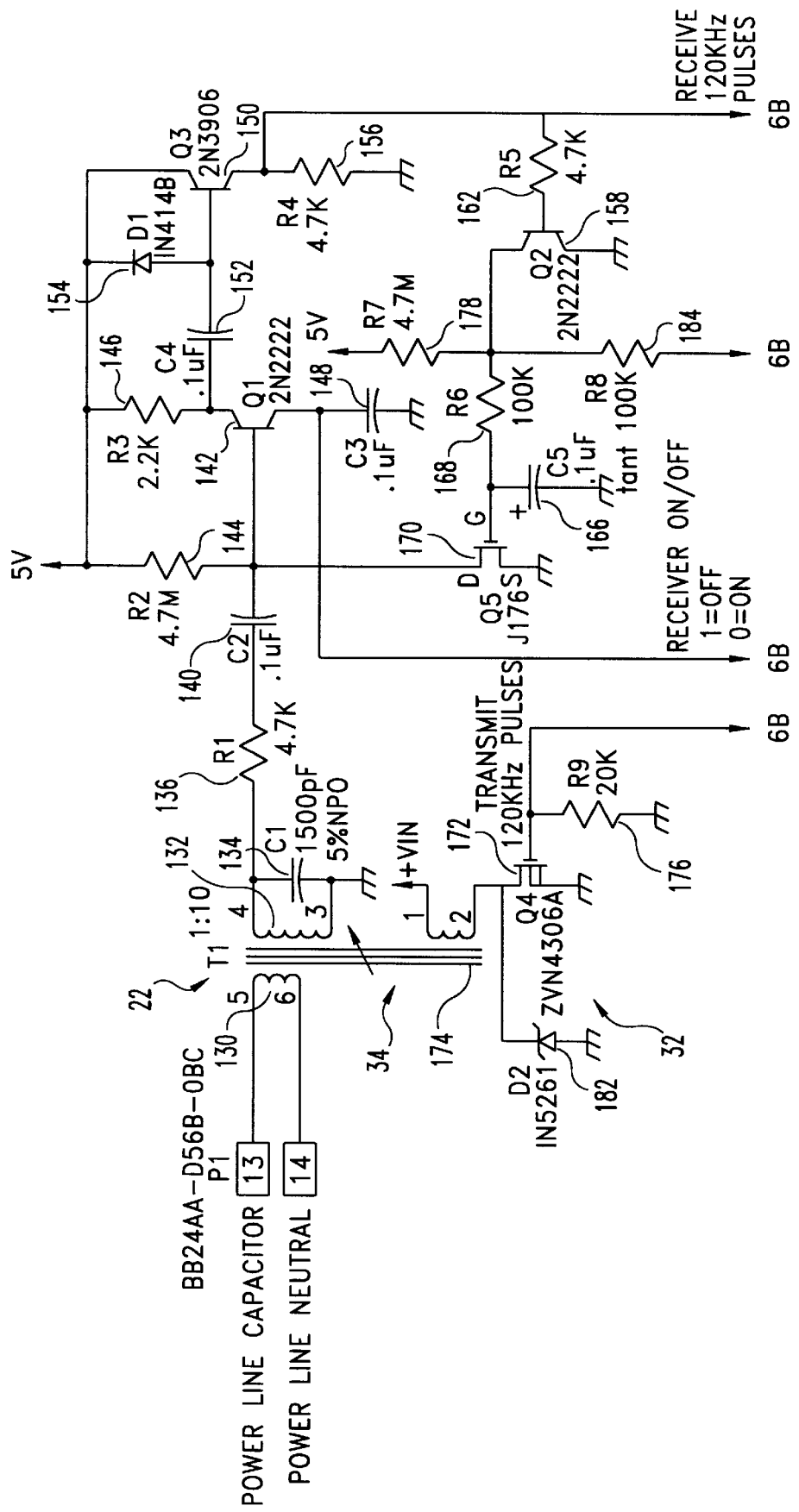
FIGS. 6a, 6b and 6c are a circuit diagram of an intelligent transceiver module with ALC feedback of the present invention separate from the remainder of a power line control system.

Receive signal conditioning circuitry 24 typically comprises a filter, amplifier and conditioner. The filter typically comprises a tuned tank circuit consisting of the secondary of the transformer of receiver coupling device 22 and a capacitor selected to provide a band pass of the 120 kHz signal which yields a roll off of approximately 20 db per decade. It will be recognized that such a filter assembly may be replaced with a higher order filter to improve the signal selectivity of module 20. The output of the filter is resistively isolated via a series impedance prior to it being passed to the amplifier. The amplifier typically comprises a transistor circuit to adjust the gain. The output of the filter is amplified with the first (NPN) transistor. The microprocessor enables or disables the receiver circuit by an I/O port connected to the first transistor's emitter. The receiver is enabled when this line is at a logic 0 level and disabled when the line is high impedance (tri-stated). The receiver is enabled by the microprocessor only during the receive widow and disable all other times. The receiver is also disabled by the microprocessor during transmission. This action prevents the Automatic Level Control ("ALC") configuration of feedback control circuitry 26 (an ALC configuration is shown in FIG. 6a which is described in detail below) from adversely responding to noise signals outside of the receive window. The output of the amplifier is passed to the conditioner. The conditioner typically comprises a transistor circuit to create a digital signal. The amplified signal from the first transistor connects to a second (PNP) switching transistor that conditions the received analog signal to a digital 0 and 5V logic signal suitable for the microprocessor 30 counter input. This digital signal is also used for the ALC.

ALC typically comprises two transistor circuits feeding a signal into the amplifier. The digital signal from the conditioner connects to a third transistor which controls the gate voltage of a fourth transistor (P channel FET). The fourth transistor varies the input signal attenuation according to its gate voltage. The actions are no signal attenuation with 5 volts on the gate to full attenuation with 0 volts on the gate. The ALC feedback signal is averaged through a RC low pass filter and connects to the gate of the fourth transistor. If no signal is present the gate voltage slowly increases to maximum sensitivity. If too much signal is present the gate level is decreased by the third transistor. The ALC control voltage can also be controlled by the microprocessor 30. The ALC level is increased or decreased by single digital output port that is either tri-state, logic zero or Pulse With Modulated ("PWM"). When tri-stated the hardware controls the coarse ALC. During a logic 0 the attenuation is slowly decreased providing fine ALC adjustment.

Full microprocessor control is achieved by using PWM. The PWM signal is converted to a DC level with a first order low pass filter made from a resistor and capacitor. The DC level of the fourth transistor can be increased or decreased by changing the PWM duty cycle giving it the ability to fully modulate the amount of signal attenuation. To increase the receive signal the PWM on time is increased and visa versa. Microprocessor 30 decides how much to increase or decrease the attenuation by counting received carrier signal pulses that occur during or just after the receive "window". All digital data sent in the X-10 protocol, with the exception of the start code, is complemented on the following cycle, i.e., a one (1) follows a zero (0) and a zero (0) follows a one (1). Remember that a zero (0) will have a count of zero (0) since no carrier signal was transmitted. The start code exception is three ones followed by a zero (1110). To determine a start code, four bits are collected. If the fourth bit's bit count is 25 less than the 3 previous bit's bit count then those 4 bits are determined to be a start code, if not then the first bit of the current four bit collection is discarded and a new bit is added to the four bit collection and compared. After a start code is detected, two bits are collected and compared. The first bit must be a count of 25 more (1) or a count of 25 less (0) than the second bit to be a complement pair. If it is not, it is a bad complement pair and the entire packet following the start code will be discarded and the process will wait for another start code. When the processor receives a start code no further threshold adjustments are made.

Microprocessor 30 adjusts the negative voltage conductance as follows: If too many pulses are received on every cycle then the attenuation is too low, increase the attenuation. If too few pulses are received on every cycle then the attenuation is too high, decrease the attenuation. As a further discriminator, microprocessor 30 incorporates a count differential to make the receiver more noise tolerant. During no noise conditions the count would equal zero for a data bit zero (0) and a count above 48 but less than 121 for a valid data bit one (1). The adaptive counter measures the relative spread of counts on alternating cycles instead of an absolute range. This allows some noise to be counted without interfering with the data.

Figure 6B:
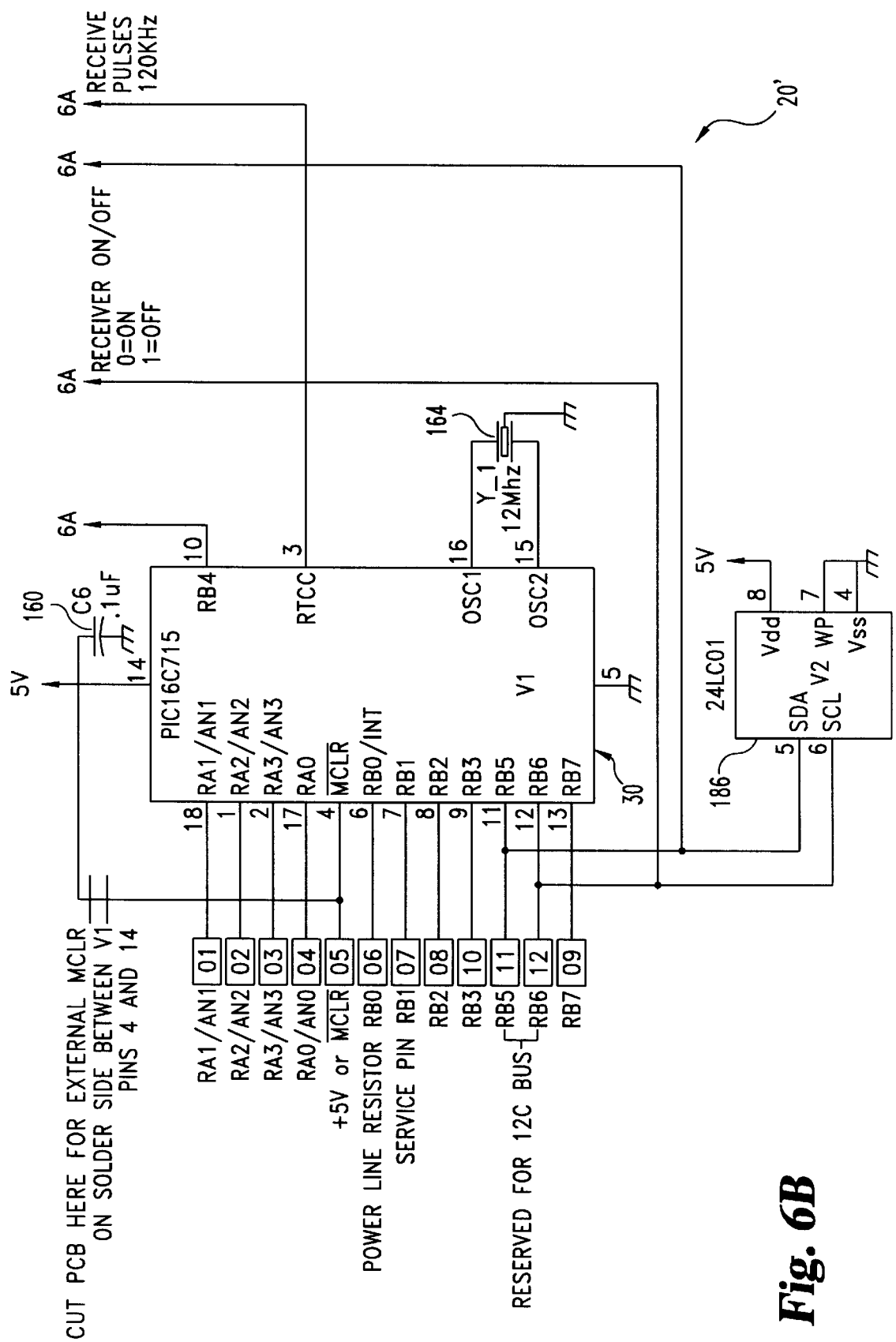
Figure 6C:
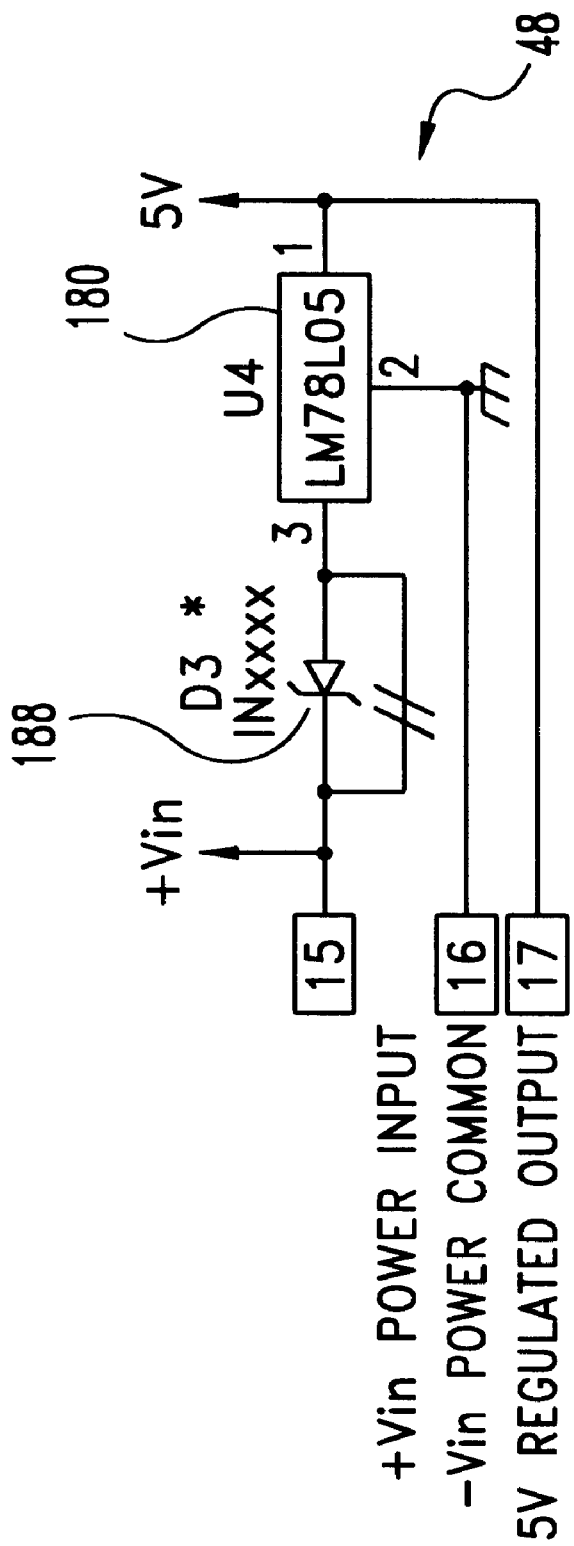

In the PLL configuration of feedback control circuitry 26 (a PLL configuration is shown in FIG. 6c which is described in detail below), the output of the filter is resistively isolated via a series impedance to eliminate the reduction of the transmit signal due to the signal limiting diodes that follow in the receive signal path. The limiting diodes condition the received signal by clipping it to 1.2 vpp before passing it on to PLL device to ensure the input signal to PLL device does not exceed the signal requirements.

PLL device is an active signal filter that is tuned to a center frequency of 120 kHz and a band width of approximately 10 kHz. The output of PLL device is pulled up to Vee (5 VDC) when no signal is present, and upon signal reception the output of PLL device is pulled low (ground). As a result, two logical states representing either the absence of signal (Vee) or the presence of signal (ground) are provided. This output from PLL device is then applied to an input on microprocessor 30 for decoding the incoming data stream to determine the message being communicated over the power lines.

Module 20 also includes transmitter circuitry that enables transmission of signals onto the power lines, thereby resulting in module 20 being capable of functioning as a transceiver as opposed to merely a receiver. The transmitter circuitry comprises microprocessor 30, transmit driver 32, and transmitter coupling device 34. Microprocessor 30 generates 120 kHz signal bursts or output that is applied to transmit diver 32. This output signal is synchronized to the input to microprocessor 30 from zero crossing detect device 56. Transmit diver 32 amplifies the output signal before it is sent to transmitter coupling device 34. A transformer of coupling device 34 is wound such that the turns ratio of the transmitter coupling device 34 to the power line coupling circuitry is approximately 6:1. In the present embodiment, one winding of the transmitter coupling device 34 is also used by the receiver coupling device 22.

The microprocessor circuitry, which ultimately controls the operations of the peripherals or end devices connected to assembly 15, and which is configured to be programmable to afford flexibility in its implementation, includes microprocessor 30, timer 38, and computer memory 40, 42 and 44. Microprocessor 30 includes multiple input/output (IO) lines, such as eight, for interfacing with end devices. These IO lines provide transistor- transistor logic levels for controlling/reading/writing various end devices. Timer 38 is a Watch Dog Timer ("WDT") that is circuited with microprocessor 30 to provide for processor reset if the code execution should lock up. Memory 40 serves as configuration memory that utilizes EEPROM technology and that allows end user configuration, such as the manner in which a dimmer is operated, to be programmed for microprocessor 30. Memory element 42 utilizes non-volatile programmable memory, typically FLASH or EPROM technology, and is utilized to store program code. Memory element 44 is used for program memory and provides Random Access Memory (RAM) for temporary variables. The programming and use of the microprocessor memory is further described below.

Module 20 further includes power regulation circuitry 48 that steps down the input voltage to 5 VDC used by each of receive signal conditioning circuitry 24, feedback control circuitry 26, microprocessor 30 and a low voltage reset circuitry 50. The 5 VDC output of power regulation circuitry 48 may also be provided as an output of module 20 for powering circuitry external to module 20. The 12 VDC input is used by transmitter coupling device 34. Low voltage reset circuitry 50 is used to reset microprocessor 30 if the 5 VDC level reaches a low level that could cause microprocessor 30 to lock up or perform in an unpredictable manner.

Still referring to FIG. 1, selected components of power line control system assembly 15 are structured external to module 20 and are shown to illustrate their interfacing with module 20. Depending on the implementation of the assembly 15 in a particular end device, various aspects of the these "external" components could be integrated into module 20. For example, DC supply device 62 or end device control circuitry 68 described below could be added to the module.

The module associated power supply and signal coupling assembly, generally designated 54, includes zero crossing detect device 56, power line coupling device 58, power line system 60, and DC supply device 62. Assembly 54 is preferably external to or not included in module 20 due to line voltage differences possible in different applications for which module 20 may be employed. If module 20 were to incorporate the components of assembly 54, the flexibility of module 20 for different applications would be lessened as module 20 would only function for a specific line voltage.

Zero crossing detect device 56 is typically a high value resistor in the neighborhood of 500 k to 2 Meg ohms. This high value resistor provides current limiting of the power line voltage to prevent damage to microprocessor 30, which is electrically circuited with device 56. Microprocessor 30 includes internal diodes that limit the voltage communicated from device 56. Microprocessor 30 uses input from zero crossing detect device 56 and receive signal conditioning circuitry 24 to synchronize its decoding of received 120 kHz signals.

Power line coupling device 58, which provides current limiting from the line side of the power distribution system, is a simple high pass filter. Power line coupling device 58 typically includes a series capacitor selected to pass the 120 kHz signal frequency at which control commands are sent over the power lines to assembly 15, and to block the lower power line frequency. Device 58 requires capacitors which are of a relatively substantial size such that they are not internalized in module 20, and the value of the capacitors differs depending on the voltage of the power line system. Power line coupling device 58 provides a coupling with the power line and both of the coupling circuitries 22, 34 of module 20 so as to provide for the relay of the receive signals to, and the transmit signals from, module 20.

Power line system 60 is any 60/50 Hz power system, which range could be from 12 VAC up to and above 600 VAC. Although designed specifically for 60/50 Hz power systems, module 20 may be modified or configured to function in other frequency domains. Module 20 is able to operate over this large voltage range because the system components that change based on the power system are external to module 20.

DC supply device 62 can be any of a variety of types known in the art that provide 8 to 24 volts to module 20 for operation.

The module associated end device and program coupling components, generally designated 66, are also external to module 20 to allow greater flexibility of module 20 in interfacing with a wide variety of end devices.

End device control circuitry 68 interfaces with microprocessor 30 and controls the operation of the external end devices by virtue of commands received from microprocessor 30 during its program execution. Reset/Vpp (programming voltage) element 70 is circuited with a module pin connected to microprocessor 30 and allows microprocessor 30 to be reset or programmed from an external source without removing microprocessor 30 from module 20 (but after removing module 20 from the printed circuit board to which it and the remainder of the control system components are connected). Address pin/ status LED element 72 is connected to a standard data I/O line of microprocessor 30 and is used to program the address and operating characteristics of module 20, and further may provide a visual status indication for module 20. For example, LED element 70 may be programmed to light up when module 20 is in the programming mode described below. An external clock referenced at 74 may also be provided if the user would like to provide a clock signal for the processor's internal timer. Although shown in FIG. 1, clock 74 is not actually employed in the above-described module 20 but is simply shown to illustrate the flexibility of module 20 in that a timing signal to microprocessor 30 may be externally furnished.

Referring now to FIGS. 2–5, there are diagrammatically shown intelligent transceiver module 20 and various other portions of power line control system assembly 15 being employed to control the operation of different end devices. The general principles of the power line control system implemented in FIGS. 2–5 are well known and further explained in the reference manual that is attached hereto as Exhibit "A" and incorporated in its entirety herein by reference.

Figure 2:
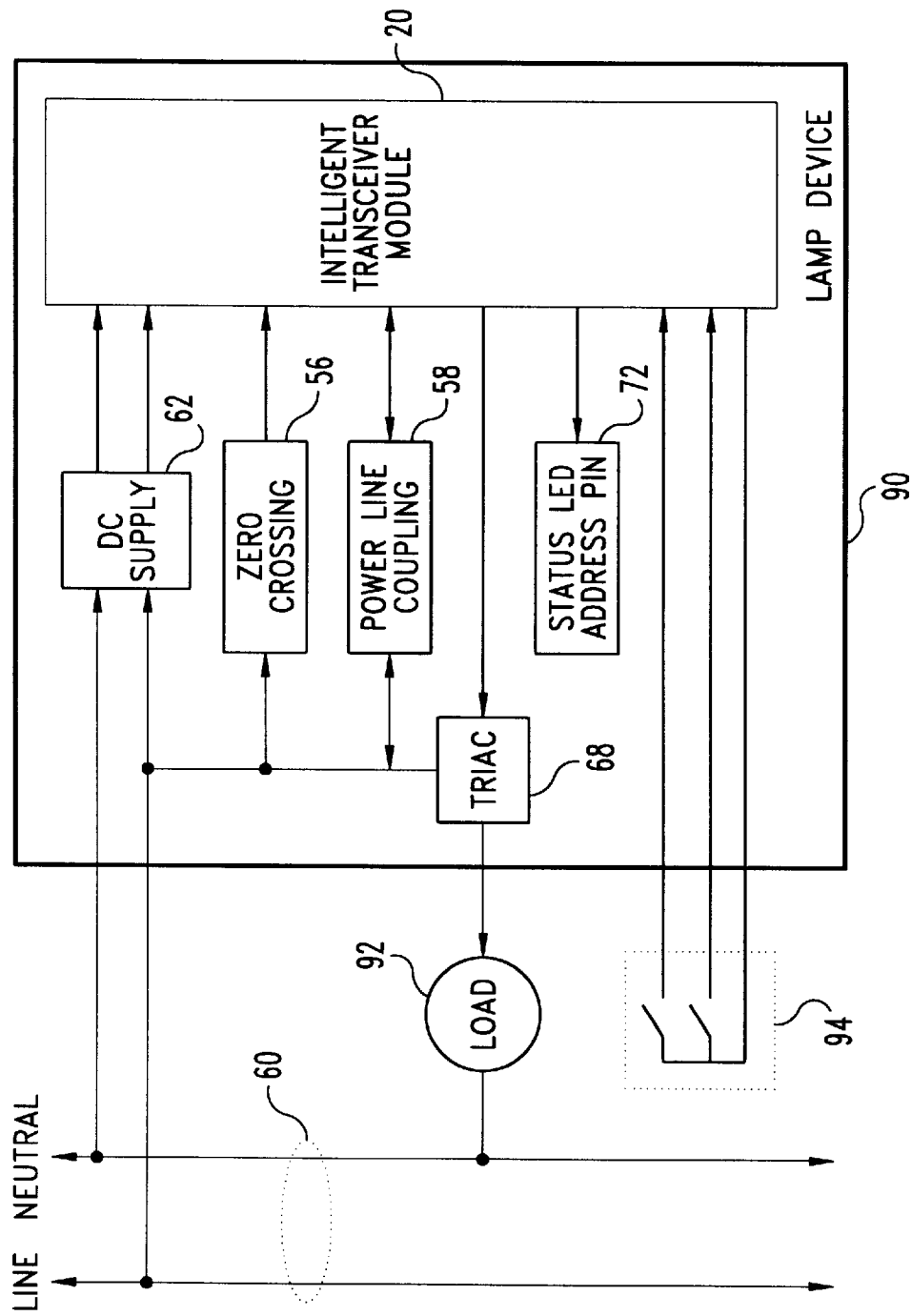
FIG. 2 is a block diagram showing the present invention being utilized to control a lamp device.

Referring to FIG. 2, the inventive power line control system assembly has been integrated into a lamp device, generally designated 90, to control an incandescent light. In particular, module 20 and the other components of assembly 15 are installed on a common printed circuit board which may be installed as a single unit within, for example, the base of the lamp device. Lamp device 90 comprises a load or light bulb 92, and local, manually controllable switches 94 circuited with module 20. Module 20 is powered by DC supply device 62 and receives operating commands from, and may transmit information to, the power line system 60 through power line coupling device 58. Address pin/status LED element 72 allows the configuration of lamp device 90, or in other words the manner in which lamp device 90 is controllable by way of the power control system, selected by the end user to be set in the second of two programming stages described further below. Zero crossing detect device 56 is used to synchronize the reception and transmission of the power line data. Triac 68' is one example of an end device control circuitry labeled as 68 in FIG. 1, and it is controlled via the microprocessor 30 of module 20 when microprocessor 30 runs its software that is programmed in the first of two stages of module programming described further below. As only three of the eight input/output lines of microprocessor 30 of module 20 are used (one line to Triac 68' and two lines to switch 94 (one for on-off data and the other for dim-bright data)), the other I/O lines may be used for other functions. For example, another line could be used to monitor the status of load 92 such that, provided microprocessor 30 were programmed accordingly, a signal indicative of the load could be transmitted by module 20 back to the remote controller from which the operation of lamp device 90 is controlled.

Figure 3:
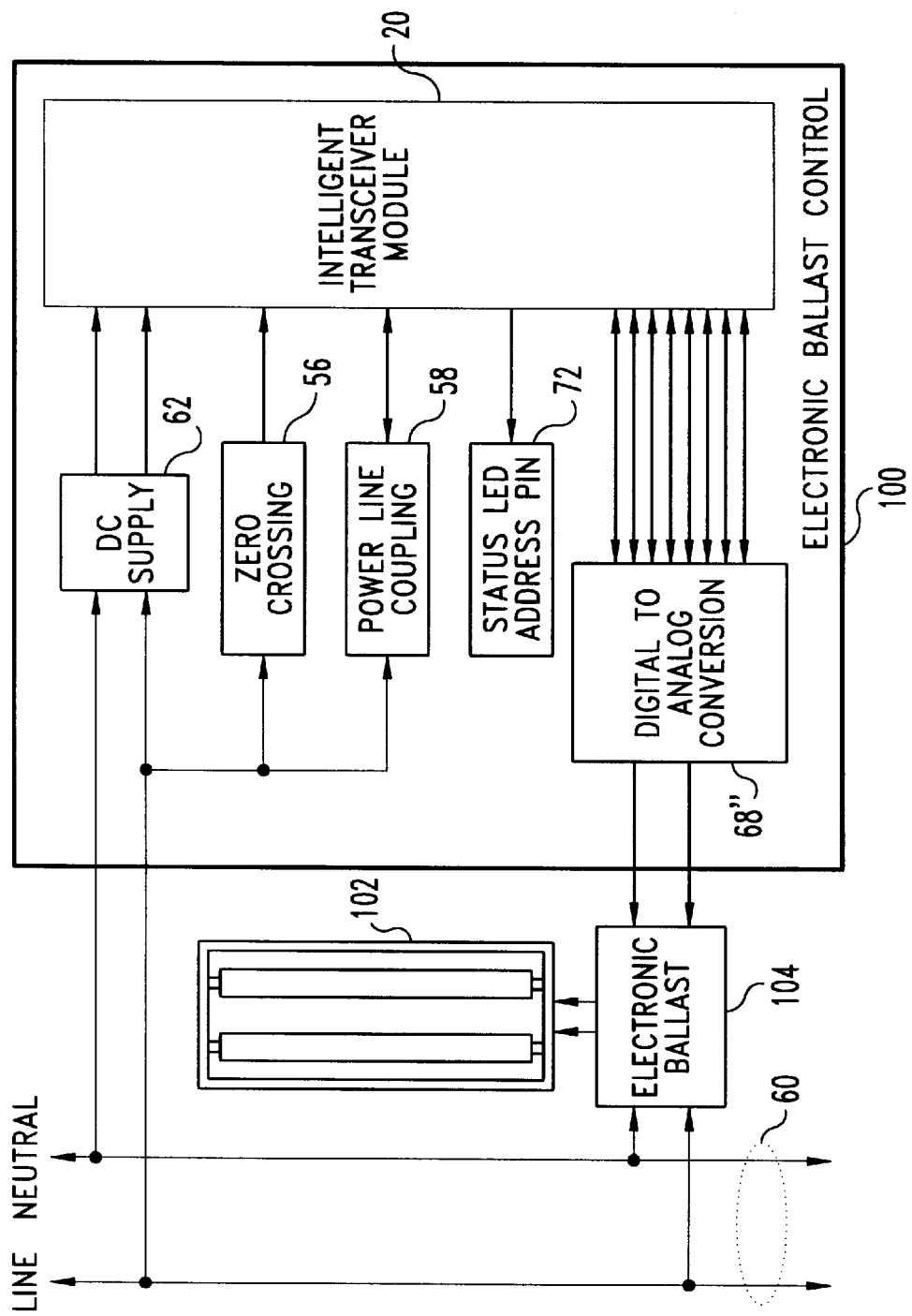
FIG. 3 is a block diagram showing the present invention being utilized to control an electronic ballast.

Referring now to FIG. 3, the inventive power line control system assembly has been integrated into an electronic ballast control unit, generally designated 100. Electronic ballast control unit 100 is used to connect a fluorescent load 102, an electronic ballast 104 that is used to control the luminous intensity of the load 102, and a module 20. Electronic ballast 104 varies the intensity of fluorescent load 102 responsive to an analog control signal. Module 20 is powered by DC supply device 62 and receives commands and transmits information via the power line system 60 through power line coupling device 58. Address pin/status LED element 72 allows configuration of the device by the end user via the second of two programming stages described further below. Zero crossing detect device 56 is used to synchronize the reception and transmission of the power line data. Digital to analog conversion circuitry 68" circuitry is another example of an end device control circuitry and converts an eight bit value output thereto by module 20 (as its microprocessor executes its programming) into an analog value usable by electronic ballast 102. Software programmed in module 20 in the first stage of module programming achieves the proper control signal being sent to circuitry 68".

Figure 4:
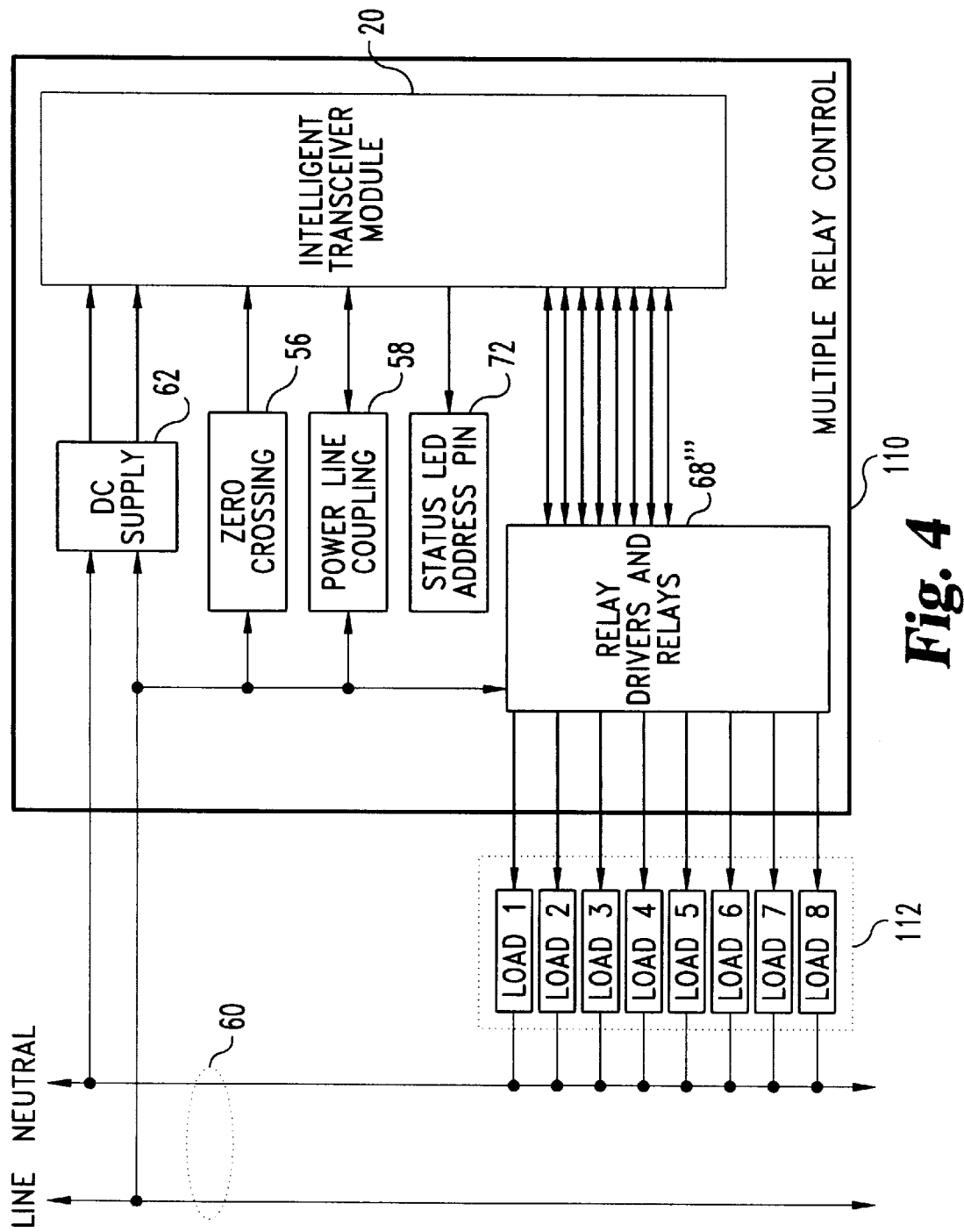
FIG. 4 is a block diagram showing the present invention being utilized in a multiple relay control device.

Referring now to FIG. 4, the inventive power line control system assembly has been integrated into a multiple relay control indicated at 110. Multiple relay control 110 includes a module 20, DC supply device 62, power line coupling device 58, address pin/status LED element 72, and zero crossing detect device 56 which function in a conceptually similar fashion to their corresponding elements in the embodiments of FIGS. 2 and 3. Up to eight individual loads, such as eight different lights indicated generally at 112, are individually controlled by multiple relay control 110. In particular, the relay drivers and relays circuitry shown at 68''' allows the user to configure each output to a specific address for operation. A basic configuration allows the user to have module 20 recognize, for example, eight addresses and then configure one address to each load. For example, an address of A2 may be assigned to the first relay output such that all commands that are received by module 20 from a remote transmitter over the power line system 60 and that are associated with "A2" would affect LOAD 1. The next consecutive address "A3" would correlate to a second relay output of circuitry 68''' such that commands to "A3" would affect LOAD 2. The remaining six relay outputs of circuitry 68''' would be assigned to the following consecutive addresses for operation, i.e. "A4"=LOAD 3, "A5"=LOAD 4, "A6"=LOAD 5, etc. In this manner, multiple loads could be discretely controlled by one multiple relay control 110.

Figure 5:
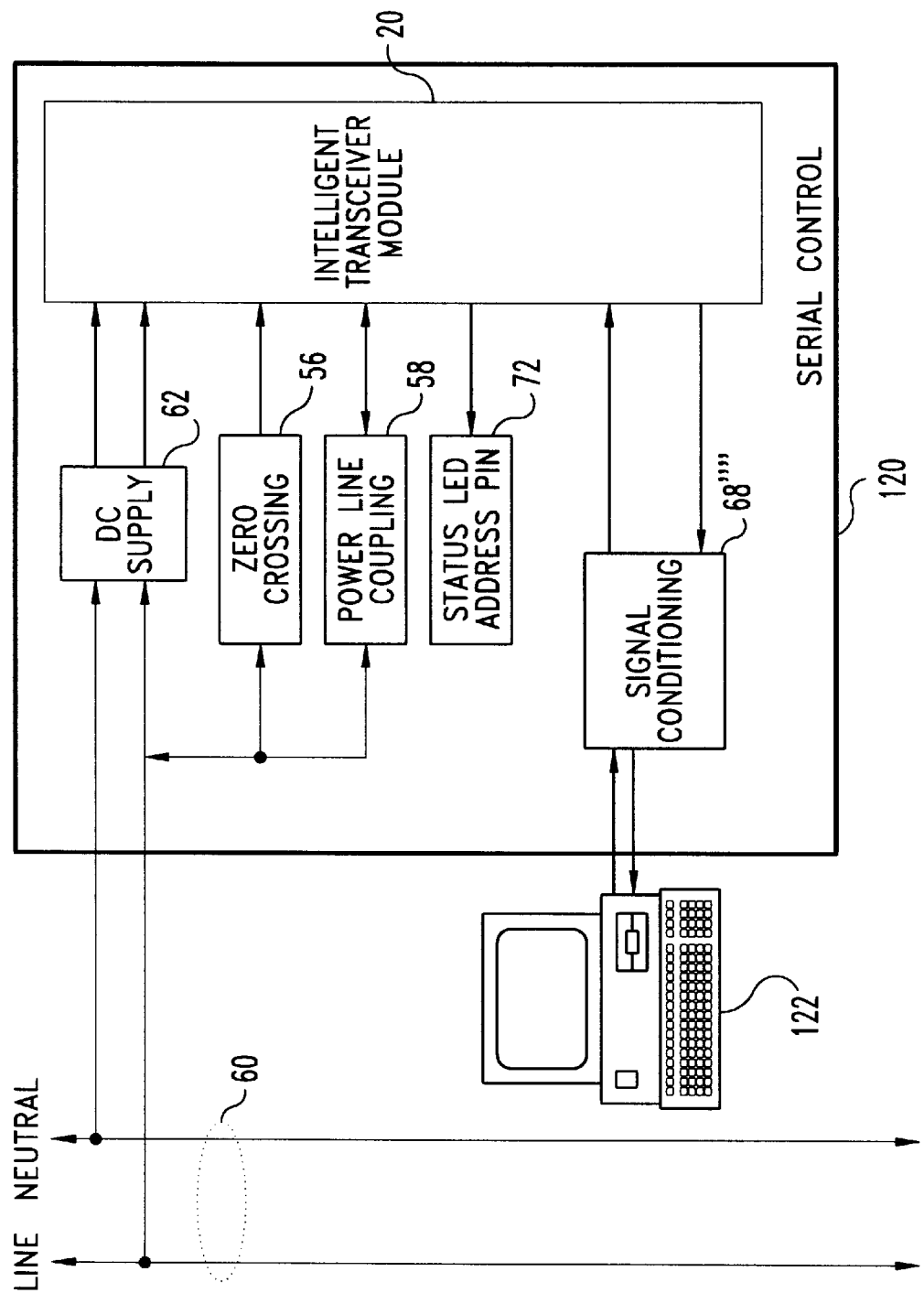
FIG. 5 is a schematic block diagram showing the present invention being utilized to serially communicate with a diagrammatically shown personal computer.

Referring now to FIG. 5, the inventive power line control system has been integrated into a serial control generally indicated at 120. Serial control 120 includes a module 20, DC supply device 62, power line coupling device 58, address pin/status LED element 72, and zero crossing detect device 56 which function in a conceptually similar fashion to their corresponding elements in the embodiments of FIGS. 2–4. Serial control 120 communicates with an end device 122, which is shown in this embodiment as a personal computer. Module 20 is programmed to interface with personal computer 122 via the signal conditioning circuitry 68"". In particular, personal computer 122, via an RS232 connection with circuitry 68"", may be used to input commands to module 20 that are then transmitted to the power line system 60 to control other devices hooked up to the power line system 60. Module 20 serves to control the routing of message traffic to and from personal computer 122 and power line system 60. It will be recognized that the RS232 protocol for serial communicating with personal computer 122 is merely illustrative, as alternate protocols may be employed within the scope of the present invention by programming modifications to microprocessor 30 coupled with modifications to circuitry 68"". RS485, RS422 or other communication topologies may alternatively be employed within the scope of the present invention.

While module 20 has been shown in FIGS. 2–5 in various applications, its ready programmability and multiple input/output port design allows a power line control system incorporating module 20 to be configured to perform a variety of different functions. For example, a power line control system assembly incorporating intelligent transceiver module 20 may be used: (a) to monitor the current draw or other data on a load and report (transmit) to the remote controller the status/data; (b) to monitor and report the temperature from a sensor; (c) to monitor the number of times an action is performed or time an event and report status; (d) on a low voltage system, to control items such as low voltage lighting and irrigation systems; (e) as a coupler repeater to couple signals across multiple phases on a multiple phase system; and (f) as an alarm system to monitor entry and exit points in a building.

Referring now to FIGS. 6a and 6b, wherein an intelligent transceiver module is schematically shown alone, the structure and function of a module 20' will be further understood in view of the following description of an alternative configuration, wherein parts corresponding to the parts of the module of FIG. 1 are correspondingly numbered. Module 20' includes seventeen pins which plug into the not shown printed circuit board used to electrically circuit module 20' to the other components of assembly 15. In FIGS. 6a and 6b, the boxed numbers 1–17 identify the seventeen module pins. Pins 13 and 14, which externally (of the module) are connected to power line coupling 58 for coupling the module received and transmitted signals to the power line, are internally (within the module) circuited with winding 130 which is part of a signal transformer. Commands or data sent over the power lines are communicated by winding 130 to transformer winding 132 which comprises the receiver coupling device 22. The transformer windings 132 and capacitor 134 form a selectively tuned circuit which is manually slug tuned to 120 KHz during production. This tune circuit functions as a first order band pass filter allowing only signals within a frequency range of approximately 114 KHz to 126 KHz to be received. The windings ratio of receiving coupling 22 provides signal amplification.

Resistor 136 impedance matches the tank to the rest of the receiver circuit. Capacitor 140 AC couples the received signals to the amplifying transistor 142 and prevents the DC resistance of windings 130 and 132 from affecting the DC base bias levels of transistor 142.

NPN transistor 142 amplifies the low level received signals from receiving coupling 22. Resistor 144 applies a small amount of base bias current placing transistor 142 at the low end of the linear conductance region. Transistor 142 is configured as a common emitter amplifier and resistor 146 supplies collector current. Transistor 142 collector current varies with the received signal causing a varying voltage of greater amplitude at the collector. Capacitor 148 de-couples transistor 142 AC currents to ground. Transistor 142 conduction is controlled by microprocessor 30, port RB6. The amplified signal further drives switching transistor 150.

The switching NPN transistor 150 conditions the amplified received signal to TTL levels so the received signal is in pure digital form readily accepted by the microprocessor 30. Capacitor 152 AC couples the amplified signal from transistor 142 to transistor 150 and provides DC isolation that would adversely effect transistor 150 base bias. Diode 154 biases the base of transistor 150 to a point near conduction and snubs any signals over 5.6 volts. Resistor 156 provides collector current to transistor 150.

The digital signal output from transistor 150 is used as the Automatic Level Control ("ALC") feedback control and further connects to the transistor 158 through a base current limiting resistor 162. Transistor 158 discharges capacitor 166 at resistor 168 rate during conduction.

Transistor 170 provides receive signal attenuation control. When the gate voltage is at 5 volts there is no attenuation. When the gate voltage is at 0 volts the input signal is totally attenuated. The gate control voltage is integrated in capacitor 166. Upon power up, resistor 178 slowly charges capacitor 166 thus decreasing the attenuation until noise or signal pulses begin occurring at the base of transistor 158 which begins to discharge capacitor 166. The process is self limiting.

In this embodiment, and unlike the embodiment of FIG. 1 where the following components were different elements of the module that interfaced with the separate microprocessor, microprocessor 30 includes on-chip programmable memory 42, RAM 44, low voltage reset 50, and watch dog timer 38. A suitable microprocessor is known as PIC16C715 and is manufactured by Microchip Technologies. Number 14 lead connects to the 5 VDC power supply and capacitor 160 provides the Vcc decoupling to prevent noise in the 5 VDC power supply line from interfering with microprocessor operation.

Number 3 lead connects to filtering, amplifying and conditioning circuitry 24 and receives a signal at TTL levels. Number 6 lead connects to module pin 6, which is externally circuited to zero crossing detect device 56 to sense the power line zero crossing. Number 7 lead connects to module pin 7, which is used for device address programming control. For example, pin 7 is used in the second stage of programming to adapt microprocessor 30 to the configuration required by a user for a specific application. Number 1, 2, 8, 9, 13, 17, and 18 leads connect to module pins 2, 3, 8, 10, 9, 4 and 1, respectively, and serve as general purpose input/output ports that allow microprocessor 30 to communicate externally of module 20' such as to control the end devices with which it is employed. Number 11 and 12 leads connect to module pins 11 and 12, respectively, and are reserved for I$^2$C Bus. Number 11 and 12 leads also connect to serial EEPROM 186 that comprises configuration memory device 40 of FIG. 1 to read and write data. Serial EEPROM 186 contains the device address, configuration and logic statements. Number 5 lead is used to ground microprocessor 30. Number 15 and 16 leads are circuited with ceramic resonator 164 that is the microprocessor clock oscillator for timing wave forms within the microprocessor. Number 4 lead connects to module pin 5, which is externally circuited with reset/Vpp element 70. The microprocessor is designed such that when a certain, such as 12 VDC, voltage is input via pin 5, microprocessor 30 is caused to go into its programming mode whereby instructions input via module pin 7 are written into memory 42 to change the operational configuration of the microprocessor during the first stage of programming. Alternatively, number 4 lead can also be connected to the 5 VDC power supply and supply 5 VDC to module pin 5.

Number 10 lead from microprocessor 30 serves as the output for signals to be sent by the transmitter components of module 20' over the power lines. Number 10 lead is circuited with a MOS transistor 172 that serves as transmit driver device 32, and which is circuited with transformer winding 174 that comprises the transmitter coupling device 34 ultimately connected with power line coupling device 58. Resistor 176 holds MOS transistor 172 off during the powering up of module 20'. Zener diode 182 protects transistor 172 from the inductive kick back spikes of the transmitter coupling circuitry 34 during transmissions.

Module 20' also includes a five volt voltage regulator 180 that comprises power regulator device 48 of FIG. 1. A suitable regulator 180 is known as LM78L05ACD and is manufactured by National Semiconductor. Regulator 180 is circuited with module pins 15 and 16 that furnish the input voltage, which is typically 16 VDC, and the regulated output of regulator 180 that powers various module components such as microprocessor 30 is also communicated to module pin 17. A special provision on the printed circuit board allows Zener diode 188 to be added for applications with input voltage greater than 24 volts.

Figure 6D:
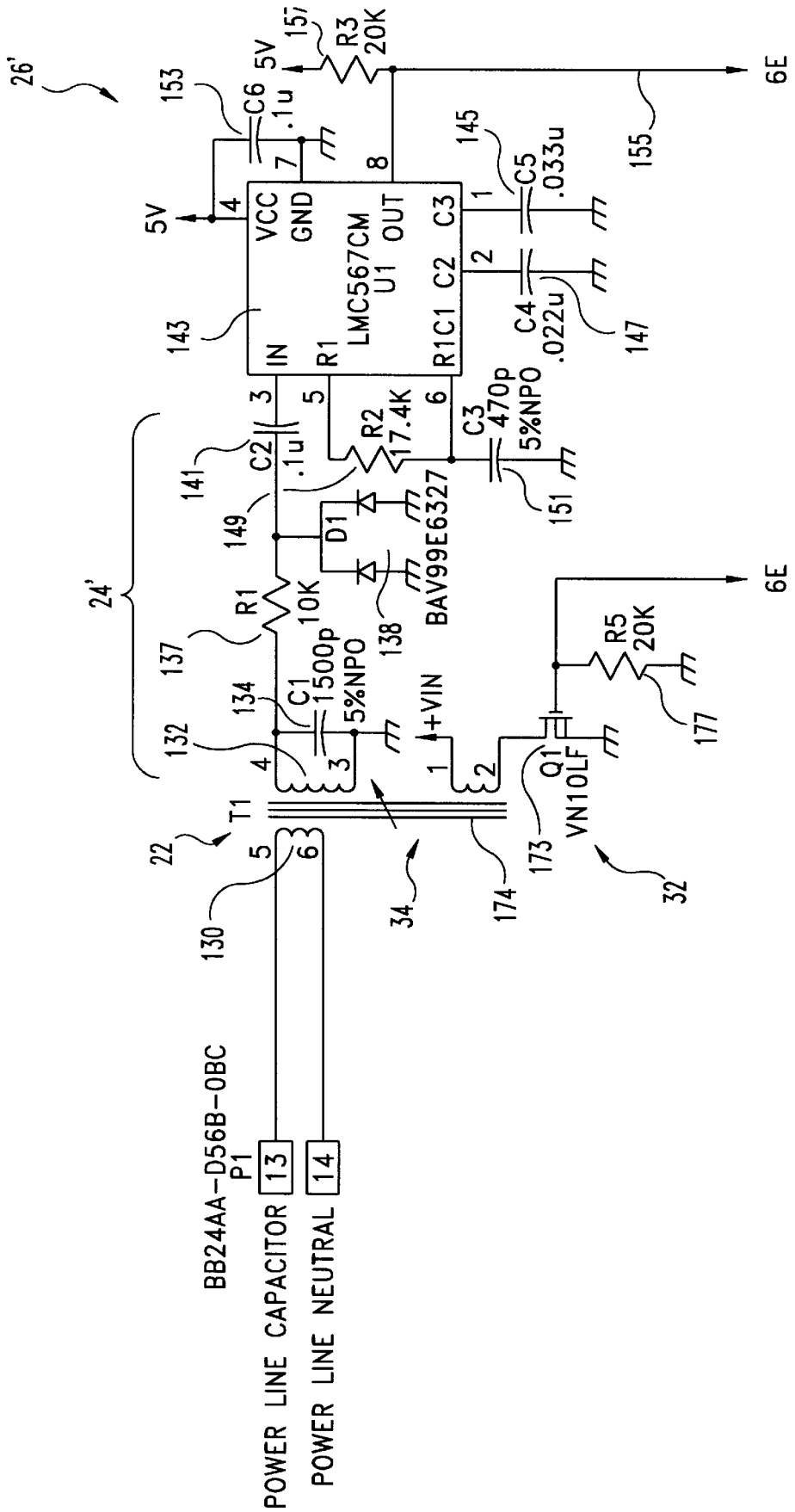
FIGS. 6d, 6e and 6f are a circuit diagram of an intelligent transceiver module with PLL technology of the present invention separate from the remainder of a power line control system.
Figure 6E:
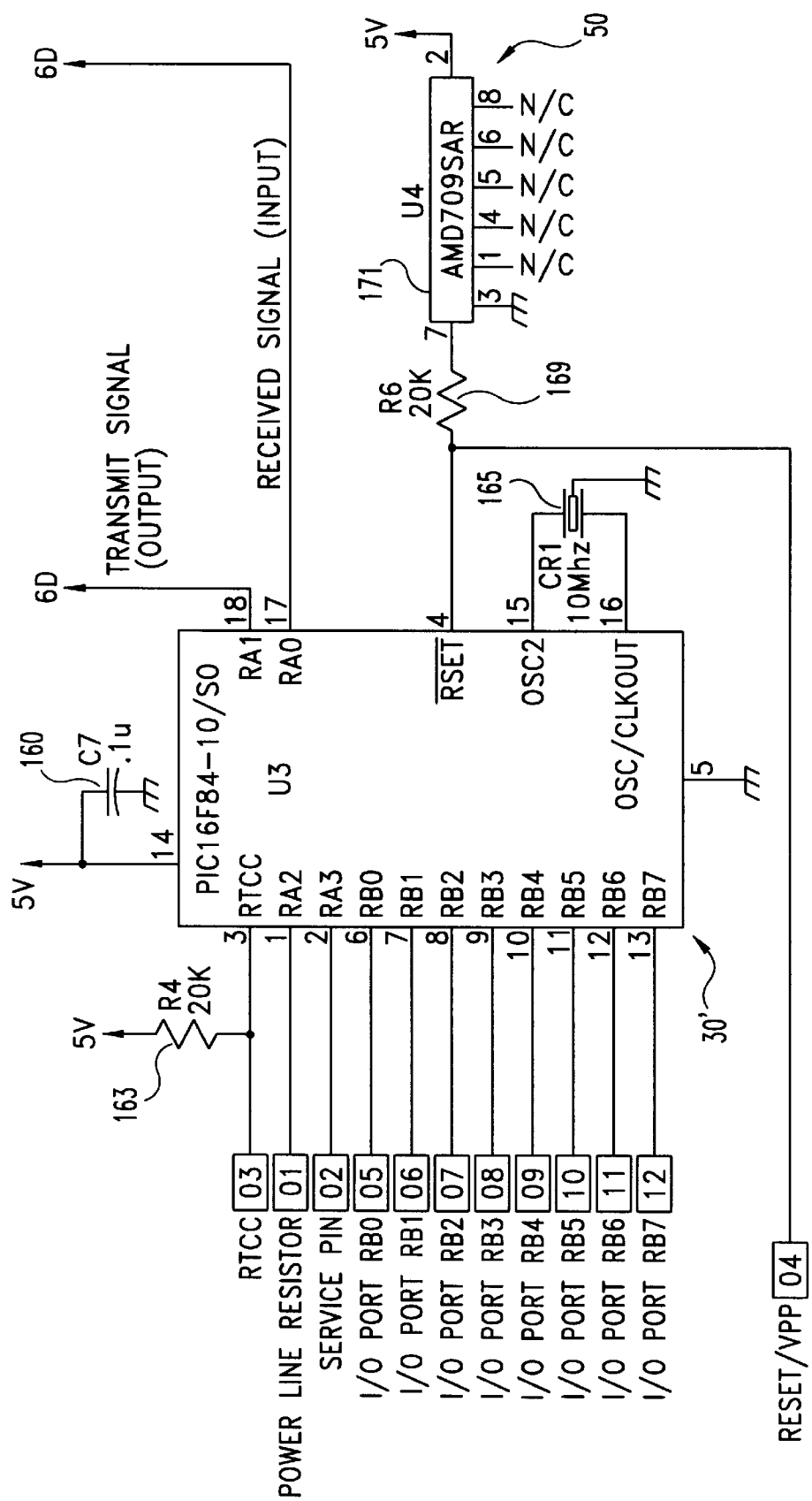
Figure 6F:
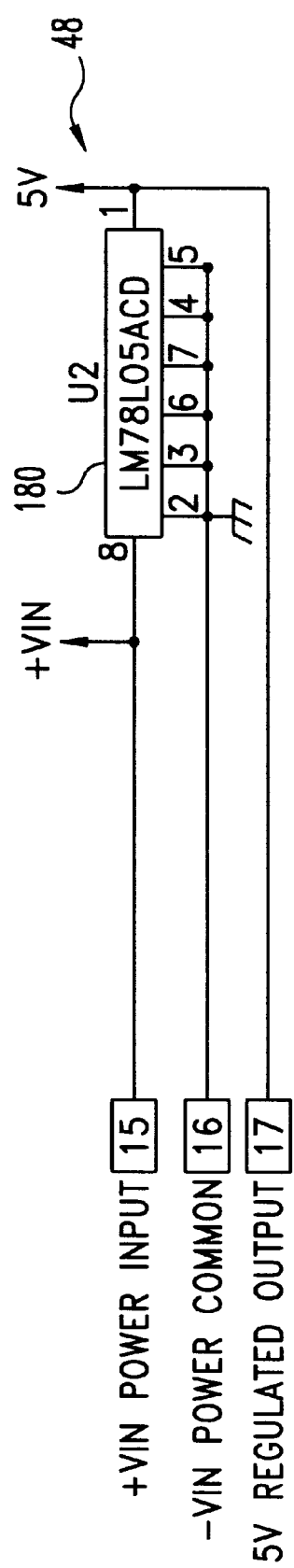

Referring now to FIGS. 6c and 6d, wherein an intelligent transceiver module is schematically shown alone, the structure and function of a module 20" will be further understood in view of the following description of another alternative configuration, wherein parts corresponding to the parts of the module of FIG. 1 are correspondingly numbered. Module 20" includes seventeen pins which plug into the not shown printed circuit board used to electrically circuit module 20" to the other components of assembly 15. In FIGS. 6c and 6d, the boxed numbers 1–17 identify the seventeen module pins. Pins 13 and 14, which externally (of the module) are connected to power line coupling 58 for coupling the module received and transmitted signals to the power line, are internally (within the module) circuited with winding 130 which is part of a signal transformer. Commands or data sent over the power lines are communicated by winding 130 to transformer winding 132 which comprises the receiver coupling device 22. Received signals then proceed through filtering assembly 24 which comprises capacitor 134 that forms a first order 120 kHz bandpass filter, resistor 137 that prevents the signal from being clipped, diodes 138 that limit the received signal, and capacitor 141 that blocks direct current from being input to the number 3 lead of integrated circuit 143 that implements PLL device 26'.

A suitable circuit 143 is known as LMC567CM and is manufactured by National Semiconductor. For this integrated circuit, its number 1 lead is coupled to ground by capacitor 145 that sets the lock-in time, its number 2 lead is coupled to ground by capacitor 147 that sets the lock-in band width, its number 5 and 6 leads are circuited with resistor 149 and capacitor 151 that set the free running oscillator frequency of the device to 120 kHz, its number 4 and 7 leads are circuited to ground and the 5V supply line with capacitor 153 circuited therebetween, and its number 8 lead is connected to conductor 155 that inputs to microprocessor 30'. Pull-up resistor 157 couples conductor 155 to the 5 VDC supply for pulling up the PLL device output when no signal is received.

In this embodiment, and unlike the embodiment of FIG. 1 where the following components were different elements of the module that interfaced with the separate microprocessor, microprocessor 30' includes on-chip EEPROM 40, FLASH memory 42, RAM 44, and watch dog timer 38. A suitable microprocessor is known as PIC16F84-10 /SO and is manufactured by Microchip Technologies. Number 14 lead connects to the 5 VDC power supply and capacitor 160 provides the Vcc decoupling to prevent noise in the 5 VDC power supply line from interfering with microprocessor operation. Number 3 lead connects to module pin 3 and a pull-up resistor 163 coupled to the 5 VDC supply pulls up the number 3 lead if no signal is received at pin 3. Pin 3 functions as a general purpose pulse or event counter input to microprocessor 30', and this counter is an optional feature for the module and is not shown being utilized in the embodiment of FIG. 1. Number 1 lead connects to module pin 1, which is externally circuited to zero crossing detect device 56 to sense the power line zero crossing. Number 2 lead connects to module pin 2, which is used for device address programming control. For example, pin 2 is used in the second stage of programming to adapt microprocessor 30' to the configuration required by a user for a specific application. Number 6, 7, 8, 9, 10, 11, 12, and 13 leads connect to module pins 5, 6, 7, 8, 9, 10, 11 and 12, respectively, and serve as general purpose input/output ports that allow microprocessor 30' to communicate externally of module 20" such as to control the end devices with which it is employed. Number 5 lead is used to ground microprocessor 30'. Number 15 and 16 leads are circuited with ceramic resonator 165 that is the microprocessor clock oscillator for timing wave forms within the microprocessor. Number 4 lead connects to module pin 4, which is externally circuited with reset/Vpp element 70. The microprocessor is designed such that when a certain, such as 12 VDC, voltage is input via pin 4, microprocessor 30' is caused to go into its programming mode whereby instructions input via module pin 2 are written into FLASH memory 42 to change the operational configuration of the microprocessor during the first stage of programming. Number 4 lead also connects through resistor 169 to a low voltage reset circuit 171 that keeps microprocessor 30' from operating unless the power supply is within an appropriate operating range. A suitable circuit 171 is known as AMD709SAR and is manufactured by Advanced Micro Devices. Resistor 169 serves to prevent damage to circuit 171 that could otherwise occur when higher voltages are applied to module pin 4 to implement in-circuit microprocessor programming.

Number 18 lead from microprocessor 30' serves as the output for signals to be sent by the transmitter components of module 20" over the power lines. Number 18 lead is circuited with a MOSFET 173 that serves as transmit driver device 32, and which is circuited with transformer winding 174 that comprises the transmitter coupling device 34 ultimately connected with power line coupling device 58. Resistor 177 holds MOSFET 173 off during the powering up of module 20".

Module 20" also includes a five volt voltage regulator 180 that comprises power regulator device 48 of FIG. 1. A suitable regulator 180 is known as LM78L05ACD and is manufactured by National Semiconductor. Regulator 180 is circuited with module pins 15 and 16 that furnish the input voltage, which is typically 12 VDC, and the regulated output of regulator 180 that powers various module components such as microprocessor 30 is also communicated to module pin 17.

It will be appreciated in view of the foregoing descriptions that the intelligent transceiver module of the present invention is designed such that programming of the microcontroller that includes microprocessor 30' is accomplished without requiring removal of the microcontroller from the module circuitry. This in-circuit programmability and reprogrammability results from the use of FLASH technology and a built in serial protocol for handling the program code download and FLASH programming.

Module 20 also implements an EEPROM configuration space that is used to determine how the module will handle various transmit/receive characteristics, thus making the module field programmable.

The part number or values of the components used in the described embodiments of the invention are given in Table 1.

TABLE 1

| DESCRIPTION | PART NUMBER/VALUE |
|---|---|
| capacitor 134 | 1500 pf |
| capacitor 140 | 0.1 µf |
| capacitor 141 | 0.1 µf |
| capacitor 145 | 0.033 µf |
| capacitor 147 | 0.022 µf |
| capacitor 148 | 0.1 µf |
| capacitor 151 | 470 pf |
| capacitor 152 | 0.1 µf |
| capacitor 153 | 0.1 µf |
| capacitor 160 | 0.1 µf |
| capacitor 166 | 0.1 µf |
| ceramic resonator 164 | 12 MHZ |
| ceramic resonator 165 | 10 MHZ |
| diode 138 | BAV99E6327 |
| diode 154 | 1N4148 |
| diode - zenner 182 | 1N5261 |
| integrated circuit 143 | LMC567CM |
| integrated circuit 171 | AMD709SAR |
| microprocessor 30 | PIC16C715 |
| microprocessor 30' | PIC16F84-10/SO |
| regulator 180 | LM78L05 |
| resistor 136 | 4.7 kΩ |
| resistor 137 | 10 kΩ |
| resistor 144 | 4.7 kΩ |
| resistor 146 | 2.2 kΩ |
| resistor 149 | 17.4 kΩ |
| resistor 156 | 4.7 kΩ |
| resistor 157 | 20 kΩ |
| resistor 162 | 4.7 kΩ |
| resistor 163 | 20 kΩ |
| resistor 168 | 100 kΩ |
| resistor 169 | 20 kΩ |
| resistor 176 | 20 kΩ |
| resistor 177 | 20 kΩ |
| resistor 178 | 4.7 kΩ |
| resistor 184 | 100 kΩ |
| serial EEPROM 186 | 24LC01 |
| transistor 142 | 2N2222 |
| transistor 150 | 2N3906 |
| transistor 158 | 2N2222 |
| transistor 170 | J176 |
| transistor 172 | ZVN4306A |
| transistor 173 | VN10LF |

The inventive modules finds beneficial application in a variety of fields, and in particular in a power line control system where its programmability facilitates the process of tailoring a module for a particular application of an end user. For example, to manufacture a module for standard X-10 type devices, a programming technique utilizes two stages of device programming. The first stage or step in programming involves programming the module for its use in a given device, such as programming the end device operation, for example the operation of a triac element or an LED, into the microcontroller. This first stage of programming is known as conceptually integrating the module with the end device. This stage of programming may be done with library code designed for this purpose that is stored during programming in the module's flash memory 42.

In addition to the end device operation, the module may be programmed to handle the power line communication protocol and the end user programming functions described below. For example, in the first programming stage, lamp device 90 would be programmed with an address and how to receive and transmit data over the power lines, how to perform, if instructed by the end user via the second stage of programming described below, certain operations or functions, and how to operate triac 68' to achieve a desired changing of the operation of the load 92. It will be appreciated that by using libraries of communication protocol and programming functions, new power line products can be made consistent in their interface and operation over an entire product line and development time can be reduced, thus decreasing time to market for new devices. Moreover, by so using library codes for this stage of programming, only the end device control/application code that is programmed in stage two needs to be developed.

The end user programming functions mentioned above are operational capabilities of the X-10 based assembly 15 which may or may not be employed in a given application. The decision as to which of these capabilities a given module assembly 15 is to utilize is left to a user in designing its product, and this decision is implemented in the second programming stage. These capabilities, as described further below, may include: (a) handling either a standard or extended address; (b) responding to a status request; (c) responding to a hail request; (d) responding to an "All Units Off " command; (e) responding to an "All Lights Off" command; (f) responding to an "All Lights On" command; (g) allowing the changing of the packet redundancy; (h) operating polite; (i) handling line collisions; (j) enabling priority queuing; (k) allowing operation at 50 Hz line frequency; (l) automatic acknowledgment; (m) acting as a line repeater; and (n) operating at different transmission locations (0°,30°,60°,90°,120°,150°).

The second stage of device programming is reserved such that an end user (such as a lamp manufacturer) may configure (or have a manufacturer so configure) the module based on its installation and intended function. In this second stage, the end user programming functions already programmed into the module in stage one can be selected or deselected according to the needs and preferences of the intended end user. A method of performing this second programming stage utilizes address pin/ status LED element 72, which is used to write the desired programming into the EEPROM or configuration memory 40 to implement those end user functions selected. This second stage allows the user to change the means of communication and basic operation of the device.

For example, the second stage programming may be used to program the end device to either a standard code address (A1-P16) or an extended code address (1A1-16P16), both of which can be accommodated by the module microprocessor.

One method of so programming the end device address would require the user pressing a button connected to the address pin/ status LED element 72 for a specified period of time, e.g. ~3 seconds. Upon release of the button the device would then enter program mode, allowing the user to set the device's address. This setting could be accomplished by sending that address desired to be set on the device on the power line system two consecutive times. At reception of the address, a status LED portion of element 72 would blink acceptance, and this address would be stored in the configuration memory 40. The end device would then remain in program mode until the user pressed the address pin element 72 a second time, or until the elapsing of a predetermined time, such as thirty seconds, during which no valid address is received.

The second stage programming may be used to program the end device (i.e in effect selecting whether or not to run the applicable routine already coded in stage one) to respond to a "Status Request" command. While such a command itself may be standard, few prior art devices are capable of responding to such a command, and none allow the user to select whether to respond to or to ignore this command. The second stage programming may be designed to have the device transmit a response not only as to the general on/off status of the status, but also, if applicable, more specific information such as the dim level of the end device.

The second stage programming may be used to program an end device which is a controller to respond to a "Hail Request". This command is used by one controller to determine if another controller is in range and using the same address space. Upon receiving a "Hail Request", the controller responds back over the power lines with a "Hail Acknowledge" signal.

The second stage programming may be used to program an end device to respond to an "All Units Off" command. This programming would allow the user to selectively set individual devices to either respond to or ignore an "All Units Off" command. Currently, all existing devices respond to the All Units Off command if the unit is in the power line control system's address group (A-P, 1A-16P). As in some situations a user may not want a particular end device to turn off (e.g. a computer, or furnace) when this command is issued, the second stage of programming allows the user to achieve this result.

The second stage of programming may be used to program an end device to respond to "All Lights Off" command. This programming would allow the user to selectively set individual devices to either respond to or ignore an "All Lights Off" command. Currently, all lamp devices respond to the All Lights Off command if within the power line control system's address group. The second stage of programming allows the user to not turn off a particular lamp (e.g. a security light) when this command is issued.

The second stage of programming may be used to program an end device to respond to or to ignore an "All Lights On" command, which could allow a user to keep individual lights off despite the controller sending such an "On" command over the power lines to such lights.

The second stage of programming also allows control of the packet redundancy transmission characteristics of the end device. Typical existing X-10 protocol devices send or receive two packets or copies of data. If the user operates in a power line environment with significant noise, or if the user wishes to improve the chances that a transmitted signal reaches the desired receivers, the number of redundant packages sent can be increased such that three, four or even more copies of data are sent. The user could also select to have just a single packet of data be transmitted to free up band width on the power lines.

The second stage of programming may be used to turn on or off a polite communication feature whereby the end device waits for at least three complete cycles (6 zero crossings) of silence on the power line before attempting to transmit its data.

The second stage of programming may be used to enable a collision detection strategy. This strategy involves monitoring the power line during "0" transmissions. If a "1" is seen during this time, the module recognizes it has lost line contention and will halt it's current transmission, timing out for the bits that have not been sent, and will try its transmission at the next available zero crossing.

The second stage of programming may be used to enable priority queuing, which involves programming the device for transmission priority queuing based on the device's number code. A delay corresponding to zero crossings is determined by the device's number code. For example, if the device's address code is 4D1, then the device would transmit at the first available zero crossing while 4D2 would transmit at the second available zero crossing.

The second stage of programming allows the user to set the device to operate on a 50 Hz power line system. If so set, the device will time all transmissions and receptions at a 50 Hz rate, but if not set the device will time all transmissions and receptions at a 60 Hz rate.

The second stage of programming may be used to active automatic acknowledgment instructions set in the first stage of programming, whereby the device automatically send its status over the power lines after reception of a valid command.

The second stage of programming may be used to activate a line repeater programming, whereby the end device would operate as a line repeater to repeat valid commands to increase signal propagation on large power line systems.

The second stage of programming may be used to select transmission locations (0°,30°,60°,90°,120°,150° ) at which the device sends data on the power line. This does not affect the receive side, as receivers always receive at the zero crossing.

The second stage of programming may be used to set the On/Off Default and Time-Out Parameters, which could allow the user to have the default condition of a light to be "Off" and have the light return to this default condition if it has not received an "On" command for a specified amount of time.

Figure 7A:
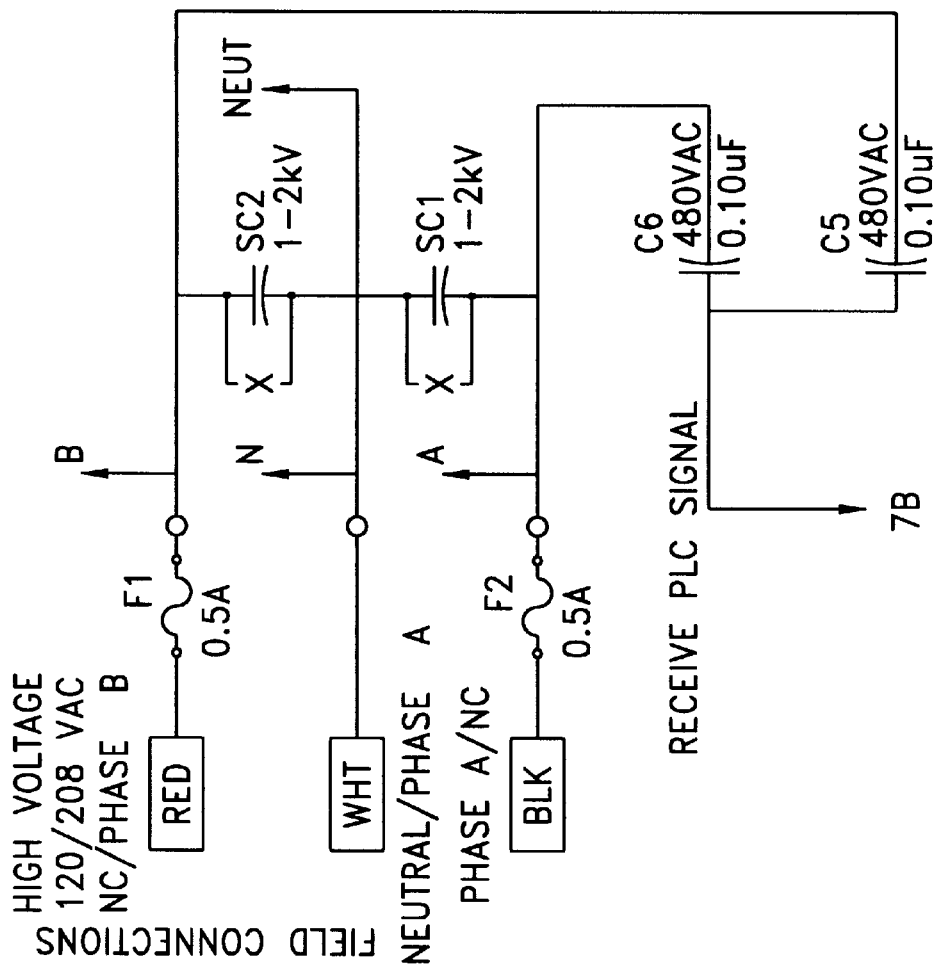
FIGS. 7a and 7b is a circuit diagram showing the inventive module within a power line control system that controls a relay output.
Figure 7B:
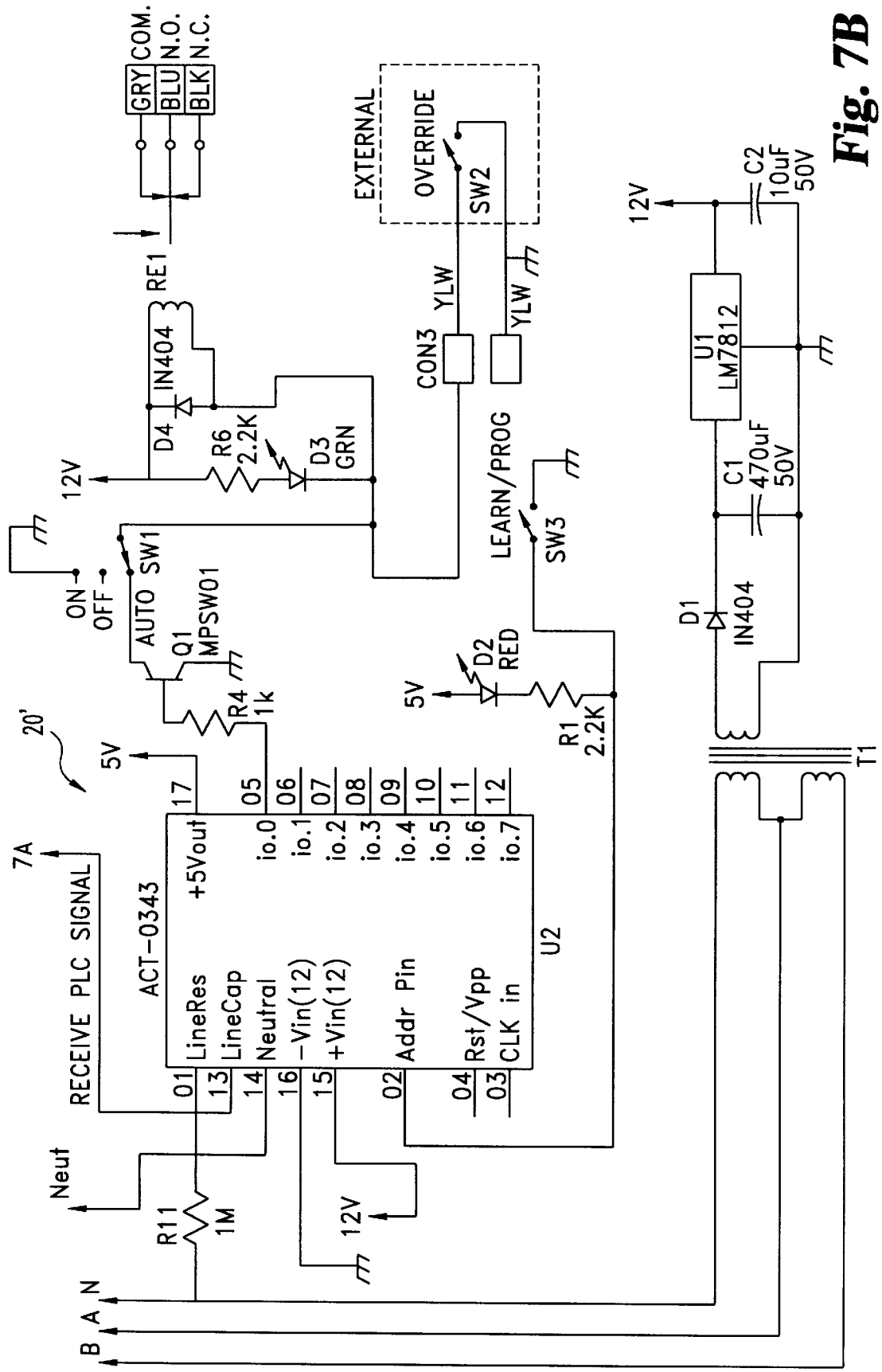
Figure 8A:
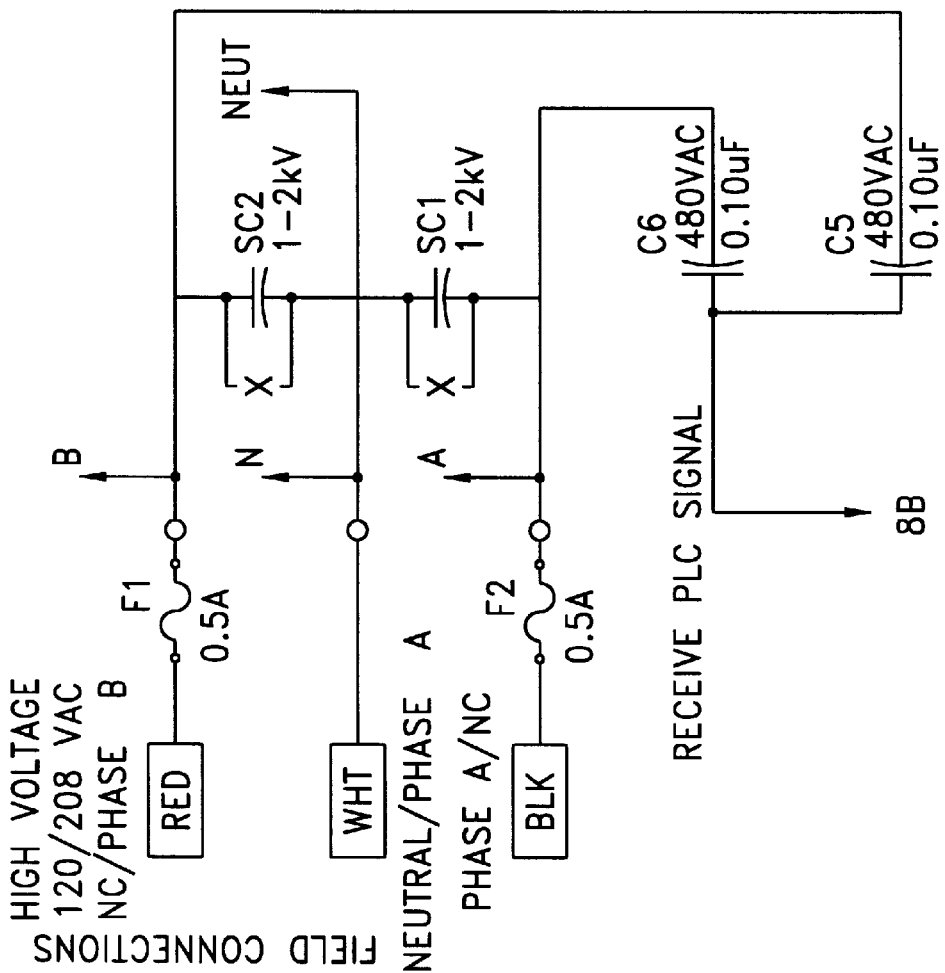
FIGS. 8a and 8b is a circuit diagram showing the inventive module within a power line control system that controls an analog input of a dimmable ballast.
Figure 8B:
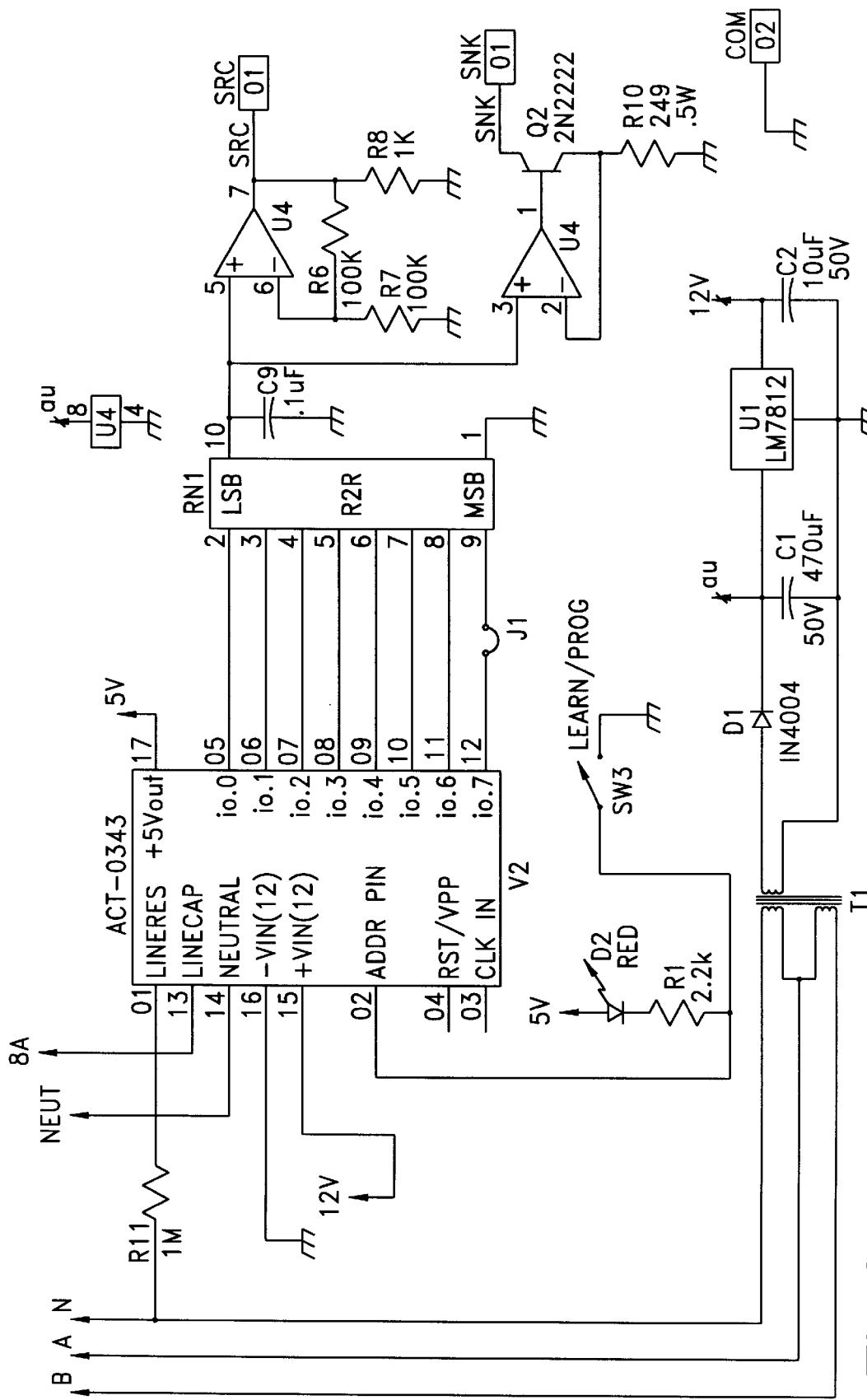
Figure 9:
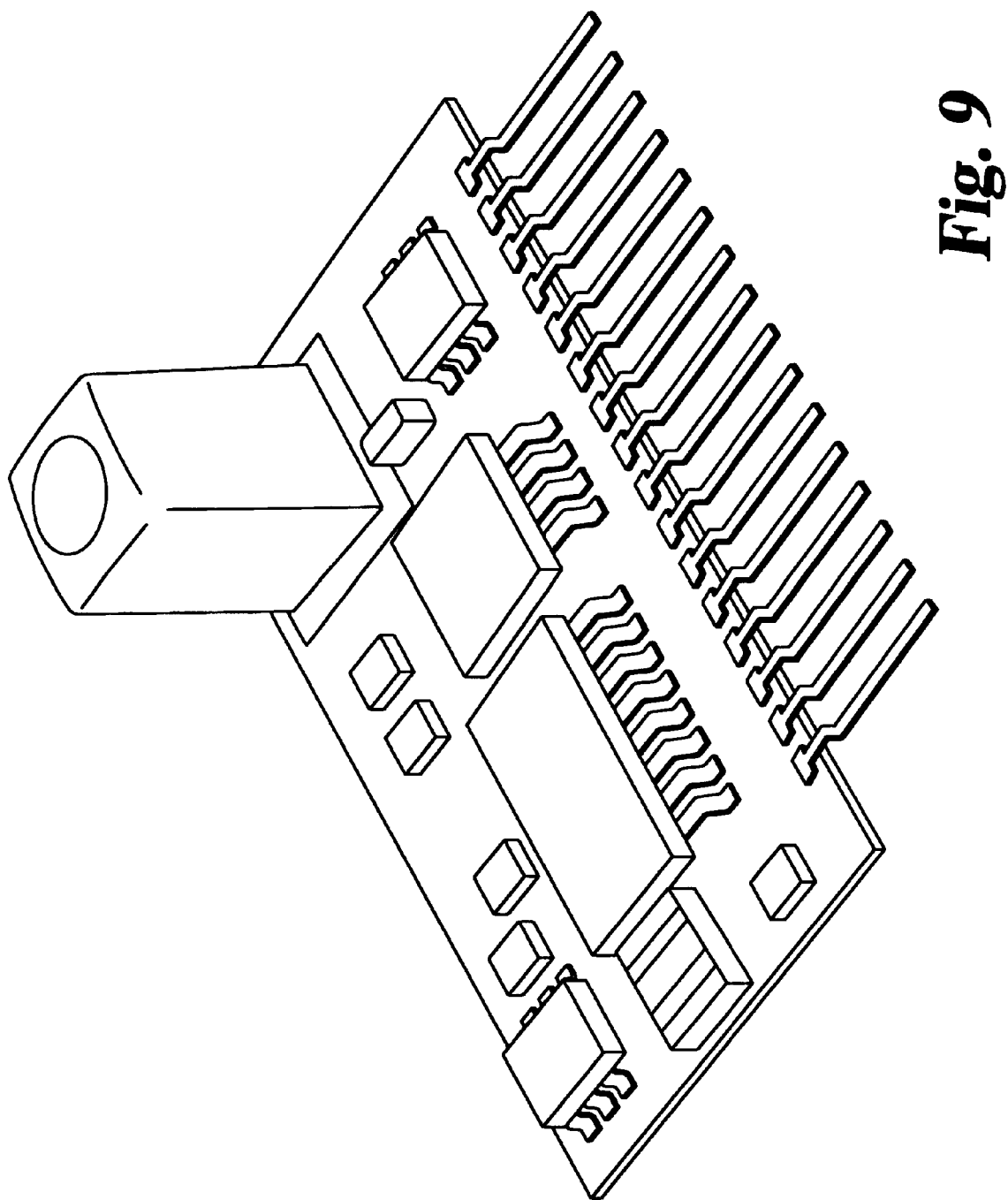
FIG. 9 is a perspective view of an inventive module.

FIGS. 7 and 8 are schematics of different products that employ the inventive module in a power line control system. FIG. 7 illustrates a product in which module 20' is used to control a relay output. FIG. 8 illustrates a product in which module 20' is used to control an analog input of a dimmable ballast.

The present invention may be further modified within the spirit and scope of this disclosure. This application is intended to cover departures from the present disclosure as come within known or customary practice in the art to which this invention pertains.

What is claimed is:

1. A module for power line control systems to enhance electrical appliance control on a single board, said single board comprising:

a transmitter circuit for sending signals over a power line;

a receiver circuit for receiving signals transmitted over the power line; and a control circuit coupled to said transmitting circuit and said receiving circuit, said control circuit including a microprocessor, a signal attenuation control circuit coupled to said receiver circuit, said signal attenuation circuit including a zero crossing detect circuit coupled to said microprocessor, said signal attenuation circuit structured and arranged to vary the amount of attenuation in relation to a count of complement pair signal pulses received by said receiver circuit, and associated memory, said memory including instructions enabling said microprocessor to interpret the conditioned received signals, generate transmit signals, attenuate the received signals according to the complement pair signal pulses counted by said microprocessor within a receive window of approximately one millisecond following a zero crossing detect, and control a circuit which controls the electrical appliance.

2. The module of claim 1 wherein said receiver circuit includes an input signal and an output signal, said output signal of said receiver circuit controlling said signal attenuation control circuit to attenuate said input signal of said receiver circuit.

3. The module of claim 1 wherein said microprocessor includes an output signal, said output signal of said microprocessor controlling said signal attenuation control circuit to attenuate said input signal of said receiver circuit.

4. The module of claim 1 wherein said memory includes programmable memory.

5. The module of claim 4 wherein said programmable memory includes FLASH memory.

6. The module of claim 1 wherein said instructions include instructions for enabling said microprocessor to be responsive to an X-10 protocol including in sequence a four bit start code, a four bit address code and a five bit extended code command.

7. The module of claim 1 wherein said memory includes serial EEPROM.

8. The module of claim 1 wherein said control circuit includes a low voltage reset means for automatically resetting said microprocessor after a low voltage condition.

9. The module of claim 1 wherein said transmitter circuit includes means for providing a 6 volts peak to peak signal on a 5 ohm reactance loaded power line.

10. The module of claim 1 wherein said receiver circuit includes means for providing a minimum receiver sensitivity of 25 mV over a loaded power line.

11. The module of claim 1 wherein said memory includes instructions for sending an automatic acknowledgment upon receiving a valid signal.

12. The module of claim 1 wherein said instructions include instructions for determining a start code by comparing bit count values for four consecutive bits and determining address and command codes by comparing bit count values for two consecutive bits.

13. The module of claim 1 wherein said signal attenuation control circuit includes an attenuation control transistor coupled to said receiver circuit and a gate control voltage capacitor.

14. The module of claim 1 wherein said control circuit includes a switching transistor coupled to said gate control voltage capacitor of said signal attenuation control circuit and providing control of said signal attenuation control circuit.

15. The module of claim 1 wherein said signal attenuation control circuit coupled to said receiver circuit provides no attenuation with an input of 5 volts and total attenuation with an input of 0 volts from said microprocessor.

16. The module of claim 1 wherein said memory includes automatic level control instructions enabling microprocessor to control said signal attenuation control circuit.

17. The module of claim 16 wherein said automatic level control instructions include pulse width modulation instructions enabling said microprocessor to provide a pulse width modulated signal to said signal attenuation control circuit.

18. The module of claim 16 wherein said microprocessor includes an input signal of pulses per cycle and said automatic level control instructions include pulse count instructions enabling said microprocessor to control said signal attenuation control circuit depending on the number of said pulses per cycle.

19. The module of claim 16 wherein said automatic level control instructions include instructions for comparing bit count values from alternating cycles and determining a differential enabling said microprocessor to control said signal attenuation control circuit depending on said differential.

20. The module of claim 1 wherein said single board is no greater in size than 4 inches by 2 inches by 2 inches.

21. The module of claim 12 wherein said bit count value for fourth bit of said four consecutive bits must be at least a predetermined value less than said bit counts for other bits of said four consecutive bits to determine said start code and said bit count values for said two consecutive bits must be different by at least said predetermined value to determine said command code.

22. A power line control system comprising:
a power line of the building;
a plurality of power outlets coupled to said line;
a master control unit coupled to said line;
a transceiver unit coupled to one of said power outlets, said unit comprising: a module constructed on a single board comprising a transmitter circuit for sending signals over said line, a receiver circuit for receiving signals over said line, and a control circuit coupled to said transmitter circuit and receiver circuit, said control circuit including a microprocessor, a signal attenuation control circuit coupled to said receiver circuit, said signal attenuation circuit including a zero crossing detect circuit coupled to said microprocessor, said signal attenuation circuit structured and arranged to vary the amount of attenuation in relation to the signals received by said receiver circuit, and associated memory, said memory including instructions enabling said microprocessor to interpret the conditioned received signals, generate transmit signals, attenuate the received signals, and control a circuit which controls the electrical appliance; and electrical appliance control circuitry coupled to said module; and
an electrical appliance coupled to said transceiver unit.

23. The system of claim 22 wherein said receiver circuit includes an input signal and an output signal, said output signal of said receiver circuit controlling said signal attenuation control circuit to attenuate said input signal of said receiver circuit.

24. The system of claim 22 wherein said microprocessor includes an output signal, said output signal of said microprocessor controlling said signal attenuation control circuit to attenuate said input signal of said receiver circuit.

25. The system of claim 22 wherein said memory includes programmable memory.

26. The system of claim 25 wherein said programmable memory includes FLASH memory.

27. The system of claim 22 wherein said instructions include instructions for enabling said microprocessor to be responsive to an X-10 protocol including in sequence a four bit start code, a four bit address code and a five bit extended code command.

28. The system of claim 22 wherein said memory includes serial EEPROM.

29. The system of claim 22 wherein said control circuit includes a low voltage reset means for automatically resetting said microprocessor after a low voltage condition.

30. The system of claim 22 wherein said transmitter circuit includes means for providing a 6 volts peak to peak signal on a 5 ohm reactance loaded power line.

31. The system of claim 22 wherein said receiver circuit includes means for providing a minimum receiver sensitivity of 25 mV over a loaded power line.

32. The system of claim 22 wherein said memory includes instructions for sending an automatic acknowledgment upon receiving a valid signal.

33. The system of claim 22 wherein said transceiver unit a power input circuit coupled to one of said power outlets of said line.

34. The system of claim 22 wherein said master control unit includes means for transmitting a start code and said instructions include instructions for determining said start code by comparing bit count values for four consecutive bits and determining address and command codes by comparing bit count values for two consecutive bits.

35. The system of claim 22 wherein said signal attenuation control circuit includes an attenuation control transistor coupled to said receiver circuit and a gate control voltage capacitor.

36. The system of claim 35 wherein said control circuit includes a switching transistor coupled to said gate control voltage capacitor of said signal attenuation control circuit and providing control of said signal attenuation control circuit.

37. The system of claim 22 wherein said signal attenuation control circuit coupled to said receiver circuit provides no attenuation with an input of 5 volts and total attenuation with an input of 0 volts from said microprocessor.

38. The system of claim 22 wherein said memory includes automatic level control instructions enabling microprocessor to control said signal attenuation control circuit.

39. The system of claim 38 wherein said automatic level control instructions include pulse width modulation instructions enabling said microprocessor to provide a pulse width modulated signal to said signal attenuation control circuit.

40. The system of claim 38 wherein said microprocessor includes an input signal of pulses per cycle and said automatic level control instructions include pulse count instructions enabling said microprocessor to control said signal attenuation control circuit depending on the number of said pulses per cycle.

41. The system of claim 38 wherein said automatic level control instructions include instructions for comparing bit count values from alternating cycles and determining a differential enabling said microprocessor to control said signal attenuation control circuit depending on said differential.

42. The system of claim 22 wherein said transceiver unit is no greater in size than 4 inches by 2 inches by 2 inches.

43. The system of claim 34 wherein said bit count value for fourth bit of said four consecutive bits must be at least a predetermined value less than said bit counts for other bits of said four consecutive bits to determine said start code and said bit count values for said two consecutive bits must be different by at least said predetermined value to determine said command code.

44. A transceiver unit for a power line control system, said transceiver unit comprising:
a power input circuit adapted to be coupled to a power line associated with the power line control system;
a module coupled to said power input circuit, said module constructed on a single board comprising a transmitter circuit for sending signals over the power line, a receiver circuit for receiving signals over the power line, and a control circuit coupled to said transmitter circuit and receiver circuit, said control circuit including a microprocessor and associated memory, said control circuit also included an attenuation circuit coupled to said receiver circuit, said signal attenuation circuit including a zero crossing detect circuit coupled to said microprocessor, said signal attenuation circuit structured and arranged to vary the amount of attenuation in relation to a count of complement pair signal pulses received by said receiver circuit, said memory including instructions enabling said microprocessor to interpret the conditioned and attenuated received signals, according to the complement pair signal pulses counted by said microprocessor within a receive window of approximately one millisecond following a zero crossing detect, and generate control signals, which control an electrical appliance; and
electrical appliance control circuitry coupled to said module and adapted to transmit said control signals to an electrical appliance;
said transceiver unit being no greater in size than 4 inches by 2 inches by 2 inches.

45. The transceiver unit of claim 44 wherein said receiver circuit includes an input signal and an output signal, said output signal of said receiver circuit controlling said signal attenuation control circuit to attenuate said input signal of said receiver circuit.

46. The transceiver unit of claim 44 wherein said microprocessor includes an output signal, said output signal of said microprocessor controlling said signal attenuation control circuit to attenuate said input signal of said receiver circuit.

47. The transceiver unit of claim 44 wherein said memory includes programmable memory.

48. The transceiver unit of claim 44 wherein said programmable memory includes FLASH memory.

49. The transceiver unit of claim 44 wherein said instructions include instructions for enabling said microprocessor to be responsive to an X-10 protocol including in sequence a four bit start code, a four bit address code and a five bit extended code command.

50. The transceiver unit of claim 44 wherein said memory includes serial EEPROM.

51. The transceiver unit of claim 44 wherein said control circuit includes a low voltage reset means for automatically resetting said microprocessor after a low voltage condition.

52. The transceiver unit of claim 44 wherein said transmitter circuit includes means for providing a 6 volts peak to peak signal on a 5 ohm reactance loaded power line.

53. The transceiver unit of claim 44 wherein said receiver circuit includes means for providing a minimum receiver sensitivity of 25 mV over a loaded power line.

54. The transceiver unit of claim 44 wherein said memory includes instructions for sending an automatic acknowledgment upon receiving a valid signal.

55. The transceiver unit of claim 44 wherein said instructions include instructions for determining a start code by comparing bit count values for four consecutive bits and determining address and command codes by comparing bit count values for two consecutive bits.

56. The transceiver unit of claim 44 wherein said control circuit includes a signal attenuation control circuit and said memory includes signal attenuation instructions enabling said microprocessor to attenuate the received signals.

57. The transceiver unit of claim 56 wherein said signal attenuation control circuit includes an attenuation control transistor coupled to said receiver circuit and a gate control voltage capacitor.

58. The transceiver unit of claim 57 wherein said control circuit includes a switching transistor coupled to said gate control voltage capacitor of said signal attenuation control circuit and providing control of said signal attenuation control circuit.

59. The transceiver unit of claim 56 wherein said signal attenuation control circuit coupled to said receiver circuit provides no attenuation with an input of 5 volts and total attenuation with an input of 0 volts from said microprocessor.

60. The transceiver unit of claim 56 wherein said memory includes automatic level control instructions enabling microprocessor to control said signal attenuation control circuit.

61. The transceiver unit of claim 60 wherein said automatic level control instructions include pulse width modulation instructions enabling said microprocessor to provide a pulse width modulated signal to said signal attenuation control circuit.

62. The transceiver unit of claim 60 wherein said microprocessor includes an input signal of pulses per cycle and said automatic level control instructions include pulse count instructions enabling said microprocessor to control said signal attenuation control circuit depending on the number of said pulses per cycle.

63. The transceiver unit of claim 60 wherein said automatic level control instructions include instructions for comparing bit count values from alternating cycles and determining a differential enabling said microprocessor to control said signal attenuation control circuit depending on said differential.

64. The transceiver unit of claim 55 wherein said bit count value for fourth bit of said four consecutive bits must be at least a predetermined value less than said bit counts for other bits of said four consecutive bits to determine said start code and said bit count values for said two consecutive bits must be different by at least said predetermined value to determine said command code.

65. A transceiver unit for a power line control system, said transceiver unit comprising:

a power input circuit adapted to be coupled to a power line associated with the power line control system;

a module coupled to said power input circuit, said module constructed on a single board comprising a transmitter circuit for sending signals over the power line, a receiver circuit for receiving signals over the power line, and a control circuit coupled to said transmitter circuit and receiver circuit, said control circuit including a microprocessor and associated memory, said memory including instructions enabling said microprocessor to interpret the conditioned received signals and generate control signals, said signals adapted to control an electrical appliance; and electrical appliance control circuitry coupled to said module and located on said module, said electrical appliance control circuitry adapted to transmit said control signals to an electrical appliance, and including a signal attenuation circuit coupled to said receiver circuit, said signal attenuation circuit including a zero crossing detect circuit coupled to said microprocessor, said signal attenuation circuit structured and arranged to vary the amount of attenuation in relation to a count of complement pair signal pulses received by said receiver circuit within a receive window of approximately one millisecond following a zero crossing detect, said microprocessor instructions enabling said microprocessor to vary the attenuation according to the complement pair signal pulses counted by said microprocessor turning the electrical appliance on and off.

66. The transceiver unit of claim 65 wherein said control circuit includes a signal attenuation control circuit coupled to said receiver circuit and said receiver circuit includes an input signal and an output signal, said output signal of said receiver circuit controlling said signal attenuation control circuit to attenuate said input signal of said receiver circuit.

67. The transceiver unit of claim 65 wherein said control circuit includes a signal attenuation control circuit coupled to said receiver circuit and said microprocessor includes an output signal, said output signal of said microprocessor controlling said signal attenuation control circuit to attenuate said input signal of said receiver circuit.

68. The transceiver unit of claim 65 wherein said memory includes programmable memory.

69. The transceiver unit of claim 68 wherein said programmable memory includes FLASH memory.

70. The transceiver unit of claim 65 wherein said instructions include instructions for enabling said microprocessor to be responsive to an X-10 protocol including in sequence a four bit start code, a four bit address code and a five bit extended code command.

71. The transceiver unit of claim 65 wherein said memory includes serial EEPROM.

72. The transceiver unit of claim 65 wherein said control circuit includes a low voltage reset means for automatically resetting said microprocessor after a low voltage condition.

73. The transceiver unit of claim 65 wherein said transmitter circuit includes means for providing a 6 volts peak to peak signal on a 5 ohm reactance loaded power line.

74. The transceiver unit of claim 65 wherein said receiver circuit includes means for providing a minimum receiver sensitivity of 25 mV over a loaded power line.

75. The transceiver unit of claim 65 wherein said memory includes instructions for sending an automatic acknowledgment upon receiving a valid signal.

76. The transceiver unit of claim 65 wherein said instructions include instructions for determining a start code by comparing bit count values for four consecutive bits and determining address and command codes by comparing bit count values for two consecutive bits.

77. The transceiver unit of claim 65 wherein said control circuit includes a signal attenuation control circuit and said memory includes signal attenuation instructions enabling said microprocessor to attenuate the received signals.

78. The transceiver unit of claim 77 wherein said signal attenuation control circuit includes an attenuation control transistor coupled to said receiver circuit and a gate control voltage capacitor.

79. The transceiver unit of claim 78 wherein said control circuit includes a switching transistor coupled to said gate control voltage capacitor of said signal attenuation control circuit and providing control of said signal attenuation control circuit.

80. The transceiver unit of claim 77 wherein said signal attenuation control circuit coupled to said receiver circuit provides no attenuation with an input of 5 volts and total attenuation with an input of 0 volts from said microprocessor.

81. The transceiver unit of claim 77 wherein said memory includes automatic level control instructions enabling microprocessor to control said signal attenuation control circuit.

82. The transceiver unit of claim 81 wherein said automatic level control instructions include pulse width modulation instructs enabling said microprocessor to provide a pulse width modulated signal to said signal attenuation control circuit.

83. The transceiver unit of claim 77 wherein said microprocessor includes an input signal of pulses per cycle and said automatic level control instructions include pulse count instructions enabling said microprocessor to control said signal attenuation control circuit depending on the number of said pulses per cycle.

84. The transceiver unit of claim 77 wherein said automatic level control instructions include instructions for comparing bit count values from alternating cycles and determining a differential enabling said microprocessor to control said signal attenuation control circuit depending on said differential.

85. The transceiver unit of claim 65 wherein said transceiver unit is no greater in size than 4 inches by 2 inches by 2 inches.

86. The transceiver unit of claim 76 wherein said bit count value for fourth bit of said four consecutive bits must be at least a predetermined value less than said bit counts for other bits of said four consecutive bits to determine said start code and said bit count values for said two consecutive bits must be different by at least said predetermined value to determine said command code.

* * * * *